United States Patent
Karanth et al.

(10) Patent No.: US 12,039,433 B2
(45) Date of Patent: Jul. 16, 2024

(54) OPTICAL MULTIPLY AND ACCUMULATE UNIT

(71) Applicant: Ohio University, Athens, OH (US)

(72) Inventors: Avinash Karanth, Canal Winchester, OH (US); Kyle Shiflett, Chillicothe, OH (US)

(73) Assignee: Ohio University, Athens, OH (US)

( * ) Notice: Subject to any disclaimer, the term of this patent is extended or adjusted under 35 U.S.C. 154(b) by 821 days.

(21) Appl. No.: 17/178,563

(22) Filed: Feb. 18, 2021

(65) Prior Publication Data

US 2021/0264241 A1 Aug. 26, 2021

Related U.S. Application Data

(60) Provisional application No. 62/979,075, filed on Feb. 20, 2020.

(51) Int. Cl.
*G06N 3/063* (2023.01)
*G06F 5/01* (2006.01)
(Continued)

(52) U.S. Cl.
CPC ............... *G06N 3/063* (2013.01); *G06F 5/01* (2013.01); *G06F 7/50* (2013.01); *G06F 7/523* (2013.01);
(Continued)

(58) Field of Classification Search
CPC ........ G06N 3/045; G06N 3/048; G06N 3/063; G06N 3/067; G06N 3/0675; G06F 5/01; G06F 7/50; G06F 7/523; G06F 7/5443; G06F 9/5027
See application file for complete search history.

(56) References Cited

U.S. PATENT DOCUMENTS 8,023,781 B2 9/2011 Nara et al.
10,268,232 B2 * 4/2019 Harris .................. G02F 1/3526
(Continued)

OTHER PUBLICATIONS

Tianshi Chen et al, DianNao: A Small-Footprint High-Throughput Accelerator for Ubiquitous Machine-Learning, 2014.
(Continued)

*Primary Examiner* — Daniel Petkovsek
(74) *Attorney, Agent, or Firm* — Wood Herron & Evans LLP

(57) ABSTRACT

Processing elements for neural network accelerators, and methods of operating the processing elements. Each of a plurality of synapse lanes outputs an electrical signal indicative of a value of a synapse. Each electrical signal is received by a respective optical AND unit including an optical microring resonator that selectively couples an optical signal indicative of the value of an input neuron based at least in part on the received electrical signal. The output of each optical AND unit is provided to either an electrical multiply and accumulate unit, or a respective interferometer of a plurality of interferometers. The interferometers are arranged in series so that optical signals are sequentially summed and shifted by each interferometer. The last interferometer outputs a shifted and accumulated sum of the outputs received from the optical AND units. In either case, the accumulated sum may then be used to generate an output neuron.

20 Claims, 13 Drawing Sheets

(51) Int. Cl.
    *G06F 7/50*         (2006.01)
    *G06F 7/523*      (2006.01)
    *G06F 7/544*      (2006.01)
    *G06F 9/50*         (2006.01)
    *G06N 3/048*      (2023.01)
    *G06N 3/067*      (2006.01)

(52) U.S. Cl.
    CPC .......... *G06F 7/5443* (2013.01); *G06F 9/5027* (2013.01); *G06N 3/048* (2023.01); *G06N 3/067* (2013.01)

(56) References Cited

U.S. PATENT DOCUMENTS 11,238,336 B2 *   2/2022   Mehrabian ............. G06N 3/045
2020/0125931 A1    4/2020   Judd et al.

OTHER PUBLICATIONS

Jorge Albericio et al, Bit-Pragmatic Deep Neural Network Computing, 2017.

Patrick Judd et al, Stripes: Bit-Serial Deep Neural Networking Computing, Department of Electrical and Computer Engineering University of Toronto, Department of Electrical and Computer Engineering University of British Columbia, 2016.

Ashkan Hosseinzadeh Namin et al, Efficient Hardware Implementation of the Hyperbolic Tangent Sigmoid Function, Department of Electrical and Computer Engineering, University of Windsor, 2009.

Guoliang Li et al, 25Gb/s 1V-driving CMOS ring modulator with integrated thermal tuning, Oracle Labs, Optical Society of America, 2011.

David A. B. Miller, Device Requirements for Optical Interconnects to Silicon Chips, Proceedings of the IEEE, vol. 97, No. 7, Jul. 2009.

* cited by examiner

OPTICAL MULTIPLY AND ACCUMULATE UNIT

CROSS-REFERENCE TO RELATED APPLICATIONS

The present application claims the filing benefit of U.S. Provisional Application Ser. No. 62/979,075, filed Feb. 20, 2020, the disclosure of which is incorporated by reference herein in its entirety.

GOVERNMENT RIGHTS

This invention was made with government support under CCF1901192 awarded by the National Science Foundation. The government has certain rights in the invention.

FIELD OF THE INVENTION

The present invention relates generally to neural networks and, more particularly, to optical multiply and accumulate units for use in a neural network accelerator.

BACKGROUND

Machine learning architectures such as deep neural networks have achieved unprecedented accuracy in modern applications such as image classification and speech recognition. However, when these architectures are implemented on a computer using general purpose central processing units, they are slow and power hungry. Thus, power dissipation has become a fundamental barrier to scaling computing system performance. Modern computers based on Von Neumann architectures are power hungry and not well adapted for a wide range of tasks including perception, communication, learning, and decision making as compared to the human brain. For example, the human brain can compute $10^{18}$ multiply and accumulate operations per second using only 20 W of power. Multicore systems have been proposed to alleviate power constraints. However, the breakdown of Dennard's scaling has further exacerbated the problem by limiting the number of cores that can be simultaneously powered on with a fixed power budget and heat extraction rate. Attempts to overcome the power barrier have been made through specialization and parallelization. To this end, application specific accelerators have been proposed that exceed the efficiency and functionality of general purpose processors, with the end goal of at least 10-100 times improvement in power or performance. Examples of applications or functions in which accelerators are used include floating point coprocessors, graphical processing units (GPUs), network offloading functions, artificial neural networks, Fast-Fourier Transforms (FFT), crypto processors, and image co-processors, for example.

With power dissipation becoming a concern in machine learning architectures, computer architects have started developing energy-efficient hardware platforms as well as optimized machine learning algorithms. Hardware platforms optimized for machine learning often include what is known as a neural network accelerator, which is a type of processor that is optimized specifically to handle neural network workloads. Machine learning algorithms are provided with a set of training examples and discover patterns that enable them to make predictions on previously unseen test examples. Artificial neural networks have been designed to facilitate this learning process, gaining their inspiration from the neuron and synapse linked structure of biological brains.

Conventional approaches to increasing artificial neural network computing speed and power efficiency have focused on developing electronic architectures, such as Application Specific Integrated Circuit (ASIC) and Field Programmable Gate Array (FPGA) chips. These architectures are specifically tailored to improve the data computation or storage ability of the accelerator. However, practical applications require convolutional neural networks with millions of multiply and accumulate operations in each layer, composing several hidden layers, which poses a serious challenge for future scaling of artificial neural networks using these techniques. Moreover, electronic-based accelerators utilize broadcast and multicast buses for achieving parallelism and are still limited by electronic clock rates and ohmic losses. The two main challenges in implementing neural networks on hardware accelerators using known technology are that accelerators cannot be easily scaled to maximally exploit the parallelism offered by neural nets, and data movement needs to be optimized to minimize energy consumption.

Thus, there is a need for improved devices and methods for providing neural networks that provide both high parallelism while minimizing energy consumption.

SUMMARY

In an embodiment of the invention, a processing element for a neural network accelerator is provided. The processing element includes a first synapse lane configured to output a first electrical signal indicative of a value of a first synapse during a first cycle of an output neuron calculation, and a first optical AND unit. The first optical AND unit includes a first electrical input operatively coupled to the first synapse lane, a first optical input configured to receive a first optical signal indicative of the value of a first input neuron transmitted during the first cycle of the output neuron calculation, a first optical output, and a first optical microring resonator configured to selectively couple the first optical signal from the first optical input to the first optical output based at least in part on a characteristic of the first electrical signal.

In an aspect of the invention, the first synapse lane may be further configured to output a second electrical signal indicative of the value of a second synapse during the first cycle of the output neuron calculation, and the first optical input may be further configured to receive a second optical signal indicative of the value of a second input neuron transmitted during the first cycle of the output neuron calculation. The first optical AND unit may further include a second electrical input operatively coupled to the first synapse lane, and a second optical microring resonator configured to selectively couple the second optical signal from the first optical input to the first optical output based at least in part on the characteristic of the second electrical signal.

In another aspect of the invention, the first optical signal may have a first wavelength, the second optical signal may have a second wavelength different from the first wavelength, the first optical microring resonator may be configured to resonate at the first wavelength when the characteristic of the first electrical signal causes the first optical microring resonator to couple the first optical signal from the first optical input to the first optical output, and the second optical microring resonator may be configured to resonate at the second wavelength when the characteristic of the second electrical signal causes the second optical microring resonator to couple the second optical signal from the first optical input to the first optical output.

In another aspect of the invention, the processing element may further include an electrical processing unit having a shift and accumulate unit and an optical-to-electrical conversion unit. The shift and accumulate unit may have an electrical input configured to receive a product of the first input neuron and the first synapse, and an output configured to output a sum of the products received during each cycle of the output neuron calculation. The optical-to-electrical conversion unit may include an optical input operatively coupled to the first optical output of the first optical AND unit, and an electrical output operatively coupled to the electrical input of the shift and accumulate unit.

In another aspect of the invention, the processing element may further include an activation function unit configured to receive the sum of the products from the shift and accumulate unit, and output an output neuron.

In another aspect of the invention, the activation function unit may apply a hyperbolic tangent function to the sum of the products.

In another aspect of the invention, the first optical microring resonator may include a cascaded pair of optical microrings.

In another aspect of the invention, the processing element may further include a second synapse lane configured to output a second electrical signal indicative of the value of a second synapse during the first cycle of the output neuron calculation, a second optical AND unit, and an optical processing unit. The second optical AND unit may include a second electrical input operatively coupled to the second synapse lane, a second optical input configured to receive a second optical signal indicative of the value of a second input neuron transmitted during the first cycle of the output neuron calculation, a second optical output, and a second optical microring resonator configured to selectively couple the second optical signal from the second optical input to the second optical output based at least in part on the characteristic of the second electrical signal. The optical processing unit may include a first optical interferometer and a second optical interferometer. The first optical interferometer may include a third optical input operatively coupled to the first optical output of the first optical AND unit, and a third optical output, and be configured so that an optical signal received at the third optical input at time $t=t_0$ is emitted by the third optical output at time $t=t_0+t_{bit}$. The second optical interferometer may include a fourth optical input operatively coupled to the third optical output of the first optical interferometer, a fifth optical input operatively coupled to the second optical output of the second optical AND unit, and a fourth optical output, and be configured so that the optical signal emitted by the fourth optical output at time $t=t_0+2\times t_{bit}$ is a sum of the optical signal received at the fourth optical input and the optical signal received at the fifth optical input at time $t=t_0+t_{bit}$, wherein $t_{bit}$ is an amount of time it takes to complete one cycle of the output neuron calculation.

In another aspect of the invention, the second optical interferometer may be a Mach-Zehnder interferometer.

In another aspect of the invention, the first cycle may be one of a plurality of cycles of the output neuron calculation.

In another aspect of the invention, the characteristic of the first electrical signal may be a voltage.

In another aspect of the invention, the first optical AND unit may further include a first optical waveguide operatively coupled to the first optical input and a second optical waveguide operatively coupled to the first optical output. The a first optical microring resonator may then operatively couple the first optical signal from the first optical input to the first optical output by coupling the first optical signal from the first optical waveguide to the second optical waveguide.

In another embodiment of the invention, a method of operating the processing element for the neural network accelerator is provided. The method includes outputting the first electrical signal from the first synapse lane, receiving the first electrical signal at the first electrical input of the first optical AND unit, receiving the first optical signal at the first optical input of the first optical AND unit, providing the first electrical signal to the first optical microring resonator, and selectively coupling the first optical signal from the first optical input to the first optical output of the first optical AND unit with the first optical microring resonator based at least in part on the characteristic of the first electrical signal.

In an aspect of the invention, the method may further include outputting the second electrical signal from the first synapse lane, receiving the second optical signal at the first optical input, providing the second electrical signal to the second optical microring resonator, and selectively coupling the second optical signal from the first optical input to the first optical output with the second optical microring resonator based at least in part on the characteristic of the second electrical signal.

In another aspect of the invention, the first optical signal may have the first wavelength, the second optical signal may have the second wavelength different from the first wavelength, the first optical microring resonator may be configured to resonate at the first wavelength when the characteristic of the first electrical signal causes the first optical microring resonator to couple the first optical signal from the first optical input to the first optical output, and the second optical microring resonator may be configured to resonate at the second wavelength when the characteristic of the second electrical signal causes the second optical microring resonator to couple the second optical signal from the first optical input to the first optical output.

In another aspect of the invention, the method may further include receiving the third optical signal from the first optical output of the first optical AND unit at the optical input of the optical-to-electrical conversion unit, converting the third optical signal to the electrical signal indicative of the product of the first input neuron and the first synapse, receiving the electrical signal indicative of the product of the first input neuron and the first synapse at the electrical input of the shift and accumulate unit, and outputting the sum of the products received during each cycle of the output neuron calculation from the shift and accumulate unit.

In another aspect of the invention, the method may further include applying the non-linear function to the sum of the products received from the shift and accumulate unit to generate the output neuron.

In another aspect of the invention, the method may further include outputting the second electrical signal indicative of the value of the second synapse from the second synapse lane during the first cycle of the output neuron calculation, receiving the second electrical signal at the second electrical input of the second optical AND unit, receiving the second optical signal at the second optical input of the second optical AND unit, providing the second electrical signal to the second optical microring resonator, selectively coupling the second optical signal from the second optical input to the second optical output based at least in part on the characteristic of the second electrical signal, providing the optical signal from first optical output of the first optical AND unit to the third optical input of the first optical interferometer configured so that the optical signal received at the third optical input at time $t=t_0$ is emitted by the third optical output of the first optical interferometer at time $t=t_0+t_{bit}$, receiving the optical signal from the third optical output of the first optical interferometer at the fourth optical input of the second optical interferometer, receiving the optical signal from the second optical output of the second optical AND unit at the fifth optical input of the second optical interferometer, and coupling the optical signals from the fourth optical input and the fifth optical input of the second optical interferometer to the fourth optical output of the second optical interferometer, wherein the second optical interferometer is configured so that the optical signal emitted by the fourth optical output at time $t=t_0+2\times t_{bit}$ is the sum of the optical signal received at the fourth optical input and the optical signal received at the fifth optical input at time $t=t_0+t_{bit}$, and $t_{bit}$ is the amount of time it takes to complete one cycle of the output neuron calculation.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Figure 1:
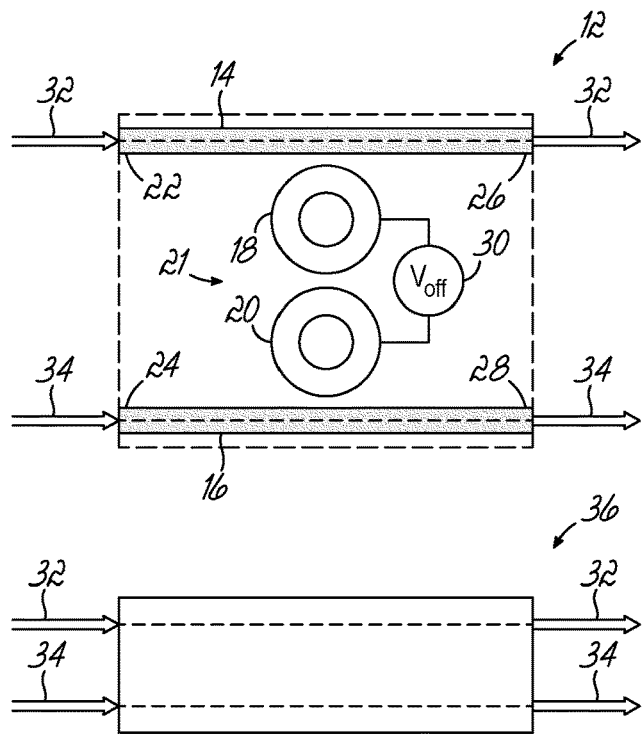
FIGS. 1 and 2 are diagrammatic views of an optical logic gate.

It should be understood that the appended drawings are not necessarily to scale, and may present a somewhat simplified representation of various features illustrative of the basic principles of the invention. The specific design features of the sequence of operations disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding. In particular, thin features may be thickened, for example, for clarity or illustration.

DETAILED DESCRIPTION

Artificial neural networks can be expanded to form deep neural networks by placing numerous connected layers between the input and output of the network. These multiple hidden layers involve immense amounts of highly concurrent matrix-vector-multiplications between a network weight matrix and the input vector. In convolutional neural networks, several of the layers typically perform multiply and accumulate functions using the same kernel repeatedly on small windows in the input layer. Because the multiply and accumulate functionality is a fundamental and highly repeated operation in convolutional neural networks, improving the operation of these units to exploit data parallelism in order to perform convolutional neural network hardware acceleration can lead to significant improvements in power consumption.

Embodiments of the invention include neural network accelerators having optical multiply and accumulate units integrated with digital processing systems. The optical multiply and accumulate units may comprise one or more optical microring resonators, Mach-Zehnder Interferometers, optical waveguides, and lasers or other light sources configured to provide a multiply and accumulate functionality. These photonic components may be further integrated with electronic processing circuitry. It has been determined that optical microring resonators and Mach-Zehnder interferometers have both the form factor (area-efficiency) and bandwidth-density for optical processing and integration. Embodiments of the photonic neural network accelerator include a hybrid version that multiples optically and accumulates electrically, and an optical version that multiples and accumulates optically for various convolution neural networks.

The hybrid architecture may be implemented using only optical microring resonators in order to improve area usage efficiency. The optical architecture uses optical microring resonators and Mach-Zehnder interferometers, and may therefore require more area for implementing convolutional neural networks than hybrid versions. A detailed design space evaluation has been performed to determine power, area, and timing requirements for different versions of photonic and electronic neural network accelerators for different layers of convolution neural networks, e.g., AlexNet, VGG16, and others. The results of this evaluation indicate a significant improvement in the energy-delay product for both photonic neural network accelerator designs over traditional electrical designs (48.4% for hybrid multiply and accumulate units and 73.9% for optical multiply and accumulate units) while minimizing latency, at the cost of increased area over pure electrical designs. Neural network accelerators in accordance with embodiments of the invention improve parallelism, latency, energy efficiency, and scalability for various convolutional neural network applications using suitable photonic components, e.g., silicon photonics.

Optical microring resonators may be used to provide optical interconnects having modulation, demodulation, and switching functions. Optical microring resonators have a relatively small footprint (e.g., 7.5 μm radius), low energy consumption (e.g., <100 fJ/bit), and can be used to modulate signals at more than 40 Gb/s. In certain embodiments, ring heaters may be used to control thermal sensitivity and avoid wavelength drift so that signals can be accurately detected. In an alternative embodiment, solutions including athermal design, runtime thermal optimization, and backend switching may be used to avoid wavelength drift.

Figure 2:
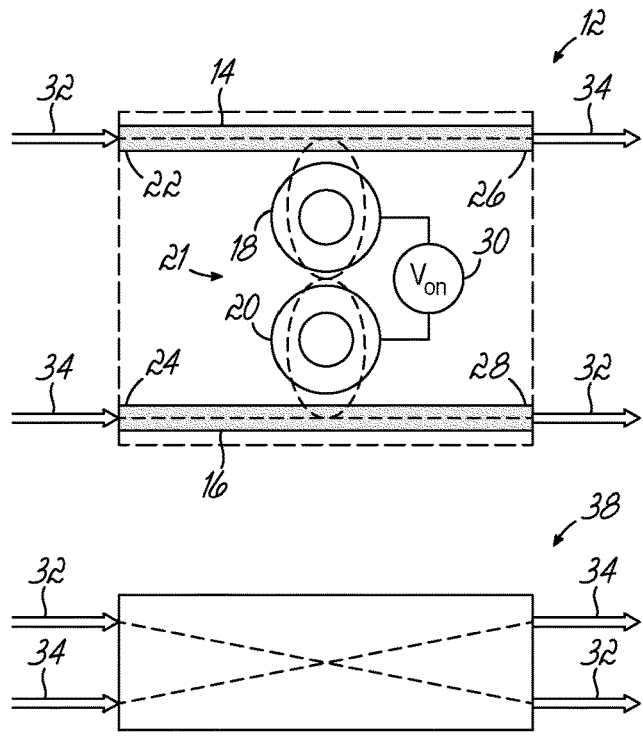

FIGS. 1 and 2 depict an optical logic gate 12 including an upper optical waveguide 14, a lower optical waveguide 16, and a cascaded pair of optical microrings 18, 20. The optical microrings 18, 20 are arranged in series between the upper and lower optical waveguides 14, 16 to form an optical microring resonator 21. Each optical waveguide 14, 16 may comprise a linear optical waveguide having a proximal end that provides an optical input 22, 24 of optical logic gate 12, and a distal end that provides an optical output 26, 28 of optical logic gate 12. The optical microring resonator 21 may be configured to selectively couple optical signals (e.g., constant or modulated beams of light, such as on-off keyed light pulses) between the optical waveguides 14, 16 such that an optical signal entering a respective optical input 22, 24 is selectively coupled to one or both of the optical outputs 26, 28 of optical logic gate 12.

The selective optical coupling between the upper and lower optical waveguides 14, 16 may depend on a characteristic of an electrical signal (e.g., an amount of voltage or current) that is applied to the pair of optical microrings 18, 20, e.g., through an electrical input 30. The optical coupling between the optical waveguides 14, 16 provided by the optical microring resonator 21 may be affected by certain characteristics, such as the distance and the coupling length between the optical waveguides 14, 16 and optical microrings 18, 20. The optical coupling may also be affected by the size and the refractive indexes of the optical microrings 18, 20, and the wavelength λ of the optical signal being selectively coupled. Optical coupling may occur, for example, when these characteristics are such that the optical path length of the optical microrings 18, 20 is an integer multiple of a wavelength of the optical signal entering one or both of the optical inputs 22, 24 of optical logic gate 12. Thus, the electrical signal may cause selective coupling between the optical waveguides 14, 16 by varying one or more characteristics of the optical microrings 18, 20 that affect coupling between the optical waveguides 14, 16 and optical microrings 18, 20. For example, a voltage may be applied to the optical microrings 18, 20 to modulate the resonant wavelength by electrically influencing the index of refraction of the material from which the optical microrings 18, 20 are made. By moving the resonant wavelength of the ring in and out of the wavelength of the optical signal being used to carry signals, the optical signal may be modulated, e.g., by on-off keying.

FIG. 1 depicts the optical logic gate 12 when the input voltage has a value (e.g., $V_{in}=V_{off}$) that offsets the optical microrings 18, 20 resonance wavelength from the wavelength of the optical signals 32, 34 entering the respective optical inputs 22, 24 of optical logic gate 12. While in this reduced-resonant or non-resonant state, the optical signals 32, 34 entering the optical inputs 22, 24 may propagate through the optical waveguides 14, 16 with reduced or insignificant coupling to the optical microrings 18, 20. Accordingly, the optical signals 32, 34 entering each optical input 22, 24 may propagate through the optical waveguide 14, 16 and exit the optical logic gate 12 through the optical output 26, 28 provided by that optical waveguide 14, 16. Thus, in this reduced or non-resonant state, the optical logic gate 12 may form a "bar configuration" 36.

FIG. 2 depicts the optical logic gate 12 when an input voltage equal to another voltage (e.g., $V_{in}=V_{on}$) is applied to the optical microrings 18, 20. When this voltage is applied, the resonant wavelength of the optical signals 32, 34 entering each optical input 22, 24 may be sufficiently close to the resonant wavelength of the optical microrings 18, 20 so as to be coupled across the optical microring resonator 21. When this occurs, optical signals 32, 34 propagating through the optical waveguides 14, 16 may couple through the optical microrings 18, 20 and emerge from the opposite optical outputs 26, 28. That is, if the optical signal 32 entering the upper optical input 22 is in resonance with optical microrings 18, 20, that optical signal 32 will appear at the lower optical output 28. Likewise, if the optical signal 34 entering the lower optical input 24 is in resonance with optical microrings 18, 20, that optical signal 34 may appear at the upper optical output 26. Thus, when the input voltage is at a level that causes the resonant wavelength of optical microrings 18, 20 to be equal to the wavelength of the optical signal 32, 34 entering the optical logic gate 12, the gate forms a "cross configuration" 38.

If an optical signal is only injected into one optical input 22, 24, e.g., the upper optical input 22, it may allow for implementation of a logical bitwise AND operation or multiply. The output (Y=A AND B) may be controlled by the incoming optical signal (A) and the input voltage applied to the microring resonators (B). In order for an optical signal to appear at the lower optical output 28 (Y=1), there must be both an incoming optical signal (A=1) at the upper optical input 22 and an input voltage applied to the microring resonators that causes them to resonate at the same wavelength as the incoming optical signal (B=1). In all other input permutations (A=0, B=0; A=0, B=1; A=1, B=0), little or none of the optical signal will appear at the lower optical output 28 (Y=0). Microring resonators may thereby be used to provide a multiply function between one of the optical inputs 22, 24 and the electrical input 30.

Figure 3:
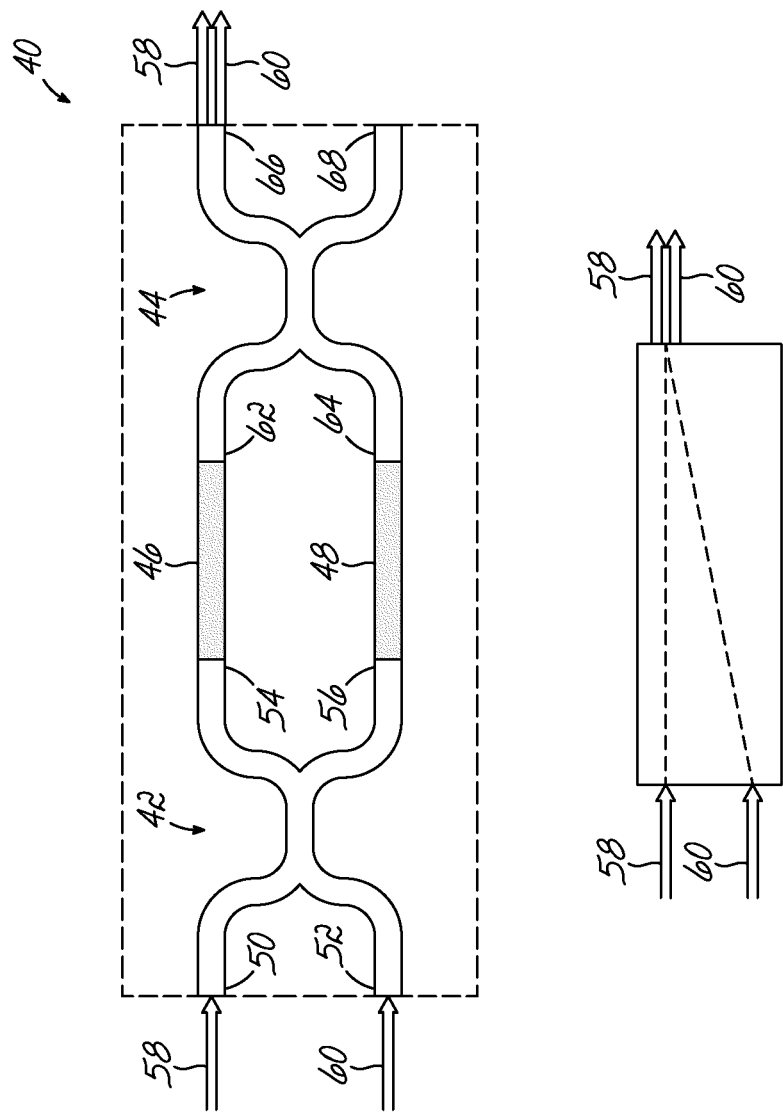
FIG. 3 is a diagrammatic view of an optical interferometer.

FIG. 3 depicts an exemplary optical adder in accordance embodiment of the invention comprising a Mach-Zehnder interferometer 40. The Mach-Zehnder interferometer 40 may include an input optical coupler 42 operatively coupled an output optical coupler 44 by phase shifters 46, 48. The input optical coupler 42 may be a 2×2 optical coupler including upper and lower optical inputs 50, 52, and upper and lower optical outputs 54, 56. A optical signal 58, 60 entering one of the optical inputs 50, 52 may be split into upper and lower beams (not shown), with the upper beam appearing at the upper optical output 54, and the lower beam appearing at the lower optical output 56. Thus, the input optical coupler 42 may operate as an optical splitter.

The output optical coupler 44 may also be a 2×2 optical coupler including upper and lower optical inputs 62, 64, and upper and lower optical outputs 66, 68. The upper optical output 54 of input optical coupler 42 may be operatively coupled to the upper optical input 62 of output optical coupler 44 by the upper phase shifter 46. The lower optical output 56 of input optical coupler 42 may be operatively coupled to the lower optical input 64 of output optical coupler 44 by the lower phase shifter 48. The phase-shifted optical signals entering the optical inputs 62, 64 of output optical coupler 44 may cause all or a portion of the optical signals to appear at the upper optical output 66, the lower optical output 68, or both optical outputs 66, 68 depending on the relative phases and amplitudes of the split beams entering the optical inputs 62, 64 of output optical coupler 44. The input optical coupler 42 may thereby recombine the optical signals 58, 60 so that they selectively appear at one or both of the optical outputs 66, 68 depending on the amount of phase shifting applied by the phase shifters 46, 48. For example, as depicted by FIG. 3, the phase shifters 46, 48 may be configured so that split beams constructively interfere at the upper optical output 66, and destructively interfere at the lower optical output 68 such that both optical signals 58, 60 emerge from the upper optical output 66.

Thus, the Mach-Zehnder interferometer 40 may enable splitting and coupling of two collimated optical signals, be highly configurable, and provide an ability to act as a tunable coupler. In operation, each split beam arriving at the optical inputs 62, 64 may have a respective phase shift $\varphi_{upper}$, $\varphi_{lower}$ provided by the upper or lower phase shifter 46, 48. Each phase shifter 46, 48 may comprise an optical delay line having one or more characteristics that can be adjusted to affect the phase shift $\varphi_{upper}$, $\varphi_{lower}$ produced by the phase shifter 46, 48. Thus, the phase shift $\varphi_{upper}$, $\varphi_{lower}$ may be fixed by design or adjustable by an electronic signal. The output optical coupler 44 may divert a portion of each phase-shifted upper and lower beam of each input optical signal 62, 64 to the upper and lower optical outputs 66, 68 of output optical coupler 44. The phase shifted upper and lower beams may constructively or discursively interfere depending on their relative phases. The Mach-Zehnder interferometer 40 may thereby allow selective coupling of optical signals 62, 64 from the optical inputs 50, 52 to the optical outputs 66, 68 with independently controllable amplitude and phase shifts. The ideal transfer matrix of the Mach-Zehnder interferometer 40 may be given by:

$$h = je^{j\Delta}\begin{pmatrix} \sin\theta & \cos\theta \\ \cos\theta & -\sin\theta \end{pmatrix} \quad (1)$$

where:

$$\theta = \frac{\varphi_{upper} + \varphi_{lower}}{2} \quad (2)$$

and $$\Delta = \frac{\varphi_{upper} - \varphi_{lower}}{2} \quad (3)$$

Embodiments of the invention may include a plurality of Mach-Zehnder interferometers 40 each configured to provide an independent power splitting ratio and overall phase shift by applying external electronic control signals to the phase shifters 46, 48. This may enable each Mach-Zehnder interferometer 40 to operate as a directional coupler or more simply as an optical switch. When used as an optical switch, the Mach-Zehnder interferometer 40 may operate in a bar state by setting $\varphi_{upper}$, =[0 or $\pi$] and $\varphi_{lower}$=[0 or $\pi$], in a cross state by setting $\varphi_{upper}$=[$\pi/2$] and $\varphi_{lower}$=[$\pi/2$], or in some state between the bar and cross states by an appropriate upper and lower phase settings. Thus, the Mach-Zehnder interferometer 40 may provide amplitude and phased controlled optical routing. Further, by adjusting $\varphi_{upper}$ and $\varphi_{lower}$ appropriately when 0<$\theta$<$\pi/2$, the Mach-Zehnder interferometer 40 can behave as a tunable coupler combining optical signals from both optical inputs into a single optical output in a summing operation 70 as shown in FIG. 3. Structures for implementing multiple cascading and self-configuring Mach-Zehnder interferometers to combine multiple input signals by adjusting the phase shifts on different arms of the individual Mach-Zehnder interferometer are disclosed by D. A. B. Miller, "Device Requirements for Optical Interconnects to Silicon Chips," *Proceedings of the IEEE*, vo. 97, no. 7, pp. 1166-1185, July 2009, the disclosure of which is incorporated by reference herein in its entirety. Using the above principles, Mach-Zehnder interferometers can be reconfigured to support different connection paths between the optical inputs and outputs and, hence, any kind of linear transformation (e.g., addition) can be implemented.

Embodiments of the invention may be implemented using on-chip Indium-Phosphide (InP) based Fabry Perot lasers with short turn-on delay as light sources. On-chip lasers with dimensions 50 μm×300 μm×5 μm with each channel operating 128 wavelengths are known in the art. Silicon waveguides having a pitch of 5.5 μm, a propagation time of 10.45 ps/mm, and a signal attenuation of 1.3 dB/cm may be used due to ease of integration with other on-chip photonic components. Germanium-doped photodetectors along with back-end signal processing (transimpedance amplifiers, voltage amplifiers, clock, and data recovery) may be used to recover the transmitted bit. To this end, multiple types of optical-to-electrical converters may be used. For example, one type of optical-to-electrical converter may utilize a photodiode and shift registers to convert serial optical pulses into parallel electrical signals. Another type of optical-to-electrical converter may be configured handle varying light-pulse amplitudes. This type of optical-to-electrical converter may require more complex logic for the conversion, such as analog-to-digital converters. To determine the value of light pulses, a photodiode may be used that outputs a current proportional to the amount of light absorbed through electron-hole recombination. This current may then be sent through an array of current comparators to determine an amplitude value of the signal. Back-end logic may then convert the output of the comparators into the bit-level data to be sent onward to activation function circuitry.

Figure 4:
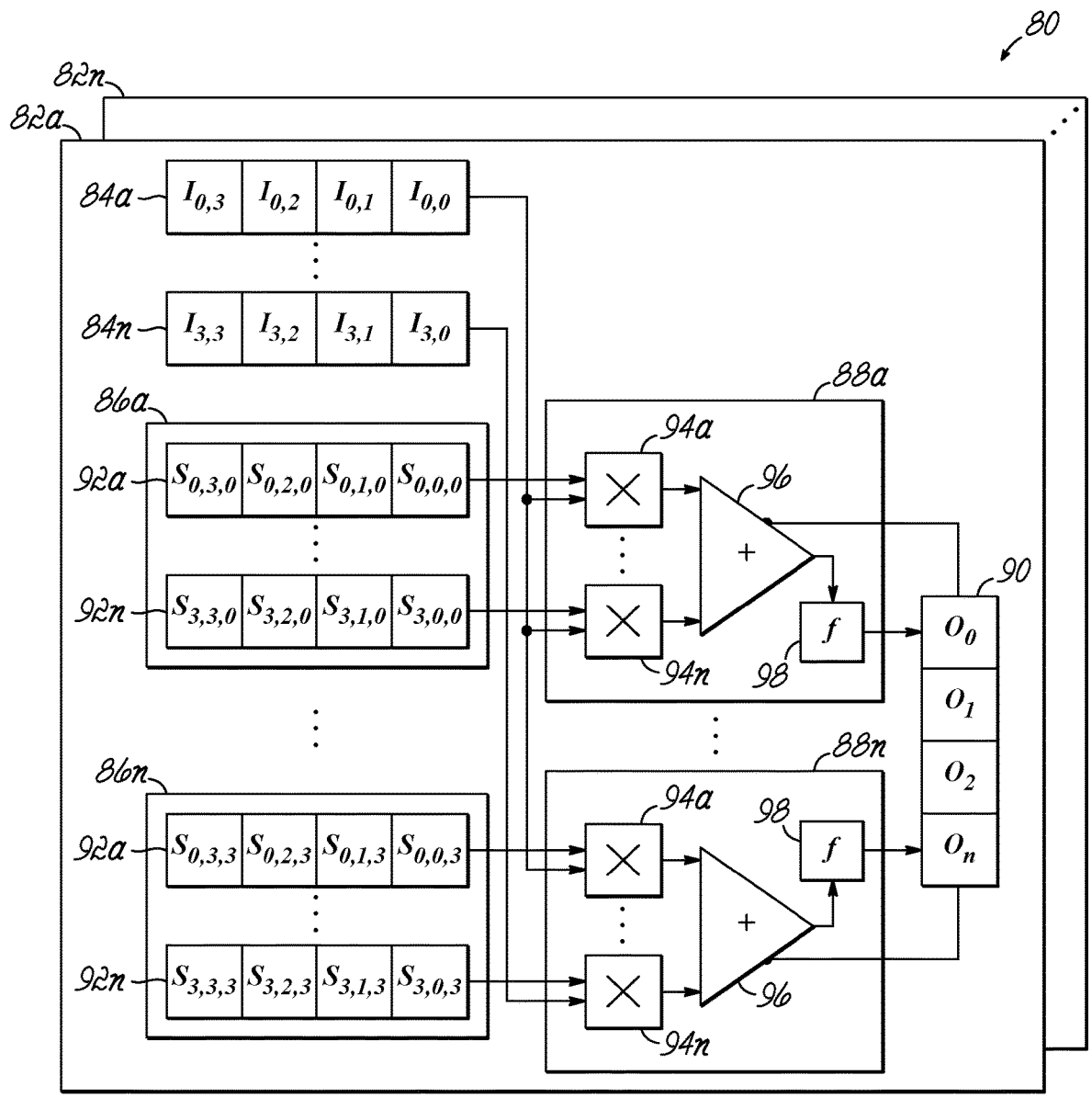
FIG. 4 is a schematic view of an exemplary neural network accelerator including a plurality of processing elements.

FIG. 4 depicts an exemplary neural network accelerator 80 including a plurality of processing elements 82*a*-82*n*. Each processing element 82*a*-82*n* includes a plurality of input neuron lanes 84*a*-84*n*, a plurality of filters 86*a*-86*n*, a plurality of inner product units 88*a*-88*n*, and an output neuron lane 90 comprising a plurality of output neurons $O_0$-$O_n$. To store data defining the output neurons $O_0$-$O_n$, the output neuron lane 90 may include an output neuron buffer. Each input neuron lane 84*a*-84*n* may include a plurality of input neurons $I_{i,j}$, where i identifies the lane, and j indexes the input neuron $I_{i,j}$ to a cycle within the lane i. To store data defining the input neurons $I_{i,j}$, The input neuron lanes may include one or more input neuron buffers. Each filter 86a-86n may include a plurality of synapse lanes 92a-92n each including a plurality of synapses $S_{i,j,k}$, where i identifies the lane, j indexes the synapse $S_{i,j,k}$ to a cycle within the lane, and k identifies the filter in which the synapse lane resides. To store data defining the synapses $S_{i,j,k}$, the synapse lanes 92a-92n may include one or more synapse buffers.

The plurality of inner product units 88a-88n may collectively comprise a neural functional unit that provides the computational logic of the processing elements 82a-82n. Each inner product unit 88a-88n may include a plurality of multiplier units 94a-94n, a summing unit 96, and an activation function unit 98. Each multiplier unit 94a-94n receives an input neuron $I_{i,j}$ and a synapse $S_{i,j,k}$, and outputs a product $I_{i,j} \times S_{i,j,k}$ of these inputs. The summing unit 96 receives the outputs of the multiplier units 94a-94n, and outputs a sum of the products received:

$$\sum_{j=0}^{n}\sum_{i=0}^{n} I_{i,j} \times S_{i,j,k}$$

The activation function unit 98 receives the output of the summing unit 96 and outputs a single output neuron $O_k$:

$$O_k = f\left(\sum_{j}\sum_{i} I_{i,j} \times S_{i,j,k}\right) \quad (4)$$

The number of input neuron lanes, filters, synapse lanes per filter, output neuron lanes, and processing elements may all be equal to n, and the above process may be repeated for each value of k=0 to n to generate all indices for a single output neuron lane. This makes up a single processing element, and may be done in all subsequent processing elements in the multiply and accumulate unit. Although for purposes of clarity, the neural network accelerators described herein may be depicted with a specific value of n (e.g., n=3, thus providing four elements a through n), it should be understood that the value of n is not limited to any particular number.

By way of example, consider an input neuron lane $INL_0$ including four elements:

$$INL_0 = (I_{0,0}, I_{0,1}, I_{0,2}, I_{0,3})$$

Let each element $I_{i,j}$ be defined by four bits with the following binary values:

$$INL_0 = (0010, 0100, 0110, 1001)$$

which in base 10 is:

$$INL_0 = (2,4,6,9)$$

Further assume that the remaining input neuron lanes 1-n are defined as follows:

$$INL_1 = (0,1,3,4)$$

$$INL_2 = (3,5,1,2)$$

$$INL_3 = (8,2,8,6)$$

For the sake of brevity, we will further consider only one filter $F_0$ having four synapse lanes ($SL_{0-n}$). Each synapse lane $SL_{0-n}$ including four synapse elements $S_{i,j,k}$ each having a four-bit width. Thus, the synapse lanes in filter $F_0$ may be represented as:

$$SL_0 = (S_{0,0,0}, S_{0,1,0}, S_{0,2,0}, S_{0,3,0})$$

$$SL_1 = (S_{1,0,0}, S_{1,1,0}, S_{1,2,0}, S_{1,3,0})$$

$$SL_2 = (S_{2,0,0}, S_{2,1,0}, S_{2,2,0}, S_{2,3,0})$$

$$SL_3 = (S_{3,0,0}, S_{3,1,0}, S_{3,2,0}, S_{3,3,0})$$

with each synapse having the following exemplary base-ten values:

$$SL_0 = (6,9,13,11)$$

$$SL_1 = (1,2,1,2)$$

$$SL_2 = (2,3,4,5)$$

$$SL_3 = (3,1,3,1)$$

For the first cycle j=0, the following multiplications may occur in the inner product unit $IP_0$ corresponding to filter $F_0$, with $P_{i,k}$ representing the output of multiplier unit 94, of filter inner product unit $IP_k$:

$$P_{0,0} = I_{0,0} \times S_{0,0,0} = 6 \times 2 = 12$$

$$P_{1,0} = I_{1,0} \times S_{1,0,0} = 0 \times 1 = 0$$

$$P_{2,0} = I_{2,0} \times S_{2,0,0} = 3 \times 2 = 6$$

$$P_{3,0} = I_{3,0} \times S_{3,0,0} = 8 \times 3 = 24$$

The output of the summing unit 96 of the inner product unit for cycle i=0 is thus 42. This value may be provided to the activation function unit 98 so that the output neuron $O_0$ is f(42) for k=0 and cycle i=0.

The second cycle j=1 may be computed in a similar manner to produce the following values for $P_{i,k}$:

$$P_{0,0} = I_{0,1} \times S_{0,1,0} = 4 \times 9 = 36$$

$$P_{1,0} = I_{1,1} \times S_{1,1,0} = 1 \times 2 = 2$$

$$P_{2,0} = I_{2,1} \times S_{2,1,0} = 5 \times 3 = 15$$

$$P_{3,0} = I_{3,1} \times S_{3,1,0} = 2 \times 1 = 2$$

The output of the summing unit 96 of the inner product unit for cycle j=1 is thus 55. Outputs for cycles j=2 and 3 may be computed to be 109 and 123 respectively. All the partial multiplications may be summed with the output neuron lane ONL0 (initialized to 0) to determine the first partial sum (Pm0+Pm1+Pm2+Pm3+ONL0) that is written to ONL0. In the above example, the first partial sum=(2×6+0×1+3×2+8×3+0)=42. Once the entire window is computed, the final sum of 329 may be fed to the activation function unit 98.

There may be multiple ways of implementing the activation function in hardware. For example, approximation techniques may used to overcome hard-to-realize implementations of activation functions. Approaches may include bit-level mapping schemes, lookup tables, piecewise linear approximation, piecewise nonlinear approximation, and designs that are a hybrid of multiple approaches. The approach described below uses a hybrid hyperbolic tangent design based on a piecewise linear approximation conjoined with bit-level mapping. This type of approach has been demonstrated to use less area with lower gate-counts than other approaches, while still providing good latencies. A hybrid approach may be used in the multiply and accumulate units for embodiments of the present invention, and provides high energy savings as compared to conventional designs.

A hardware accelerator known as "Stripes" is disclosed in "Stripes: Bit-Serial Deep neural network Computing" by P. Judd et al., 2016 49$^{th}$ Annual IEEE/ACM Intel. Symposium on Microarchitecture (MICRO), October 2016, pp. 1-12, the disclosure of which is incorporated by reference herein in its entirety. Stripes implements a multiply and accumulate unit that takes advantage of the parallelism which is innately present in deep neural networks by recognizing these properties on the bit level. By breaking down each multiply and accumulate operation into bitwise elements, Stripes accelerates the multiply and accumulate functionality through use of bitwise AND followed by a logical left-shift and accumulate, which provides a multiply and accumulate with a multiplication factor of two in a base two digital system. So, given a synapse $S_{i,j,k}$ represented in p bits, and an input neuron $I_{i,j}$, Stripes will process the synapse $S_{i,j,k}$ bit-serially over p cycles. Each cycle, one bit of the synapse $S_{i,j,k}$ and all of the input neuron $I_{i,j}$ go through an AND multiplication, accumulating the result into a running sum. This methodology is used in the exemplary accelerator designs described below.

By way of example, a neural network accelerator 80 configured according to Stripes and having a size n=16 may include 16 bit-serial input neuron lanes 84a-84n on each of 16 processing elements 82a-82n, for a total of 256 input neuron lanes. Each of 16 filters 86a-86n may include 16 synapse lanes 92a-92n. The synapse lanes 92a-92n and input neuron lanes 84a-84n may be operatively coupled to an array of 16×16 inner product units 88a-88n (i.e., 16 inner product units 88a-88n in each of 16 processing elements 82a-82n), where each inner product unit 88a-88n generates one output neuron $O_k$. The inner product unit 88k of each processing element 82a-82n may process filter k and neuron lanes 84a-84n of that processing element 82a-82n. Synapse lane k may be coupled to a horizontally aligned inner product unit 88k on each processing element 82a-82n, and the input neuron lanes 84a-84n of each processing element 82a-82n may be operatively coupled to each inner product unit 88a-88n of its processing element 82a-82n. Each inner product unit 88a-88n may receive 16 neuron bits as input, and a synapse brick which is latched onto a synapse register, where the term "brick" refers to a set of elements continuous along the i dimension. Each inner product unit 88a-88n may contain an adder tree for a total of 256 adder trees.

Processing in each processing element 82a-82n may proceed in phases of j=p cycles, where p is the precision of neurons in bits. During the first cycle of a phase, the synapse lane may provide 16 bricks of 16-bit synapses, one brick per filter 86a-86n. Each processing element 82a-82n may latch its corresponding synapse brick in a synapse buffer. Every cycle, the input neuron lanes 84a-84n may provide 256 neuron bits, and each neuron bit may be bit-wise ANDed with 16 synapses, one per processing element 82a-82n in each of the processing elements 82a-82n. Each AND operation may produce a 16-bit term. Thus, each processing element 82a-82n may calculate 16 terms corresponding to one filter and one set of input neuron lanes 84a-84n. Each processing element 82a-82n may sum its 16 terms into a partial output neuron using a dedicated 16-input adder tree. For the remaining p−1 cycles of a phase, each processing element 82a-82n may shift its partial output neurons by one bit, while accumulating another 16 terms, thereby implementing bit-serial multiplication. After p cycles, an output neuron pallet comprising 256 16-bit partial output neurons, may be produced in full. Thus, the 64 entry output neurons may be distributed across the processing elements 82a-82n, with 4 entries per processing element 82a-82n. The activation function unit 98 may be moved to the output of output neuron buffer in cases where the activation function is only applied to the full sum before it is written back to a neuron memory.

Figure 5:
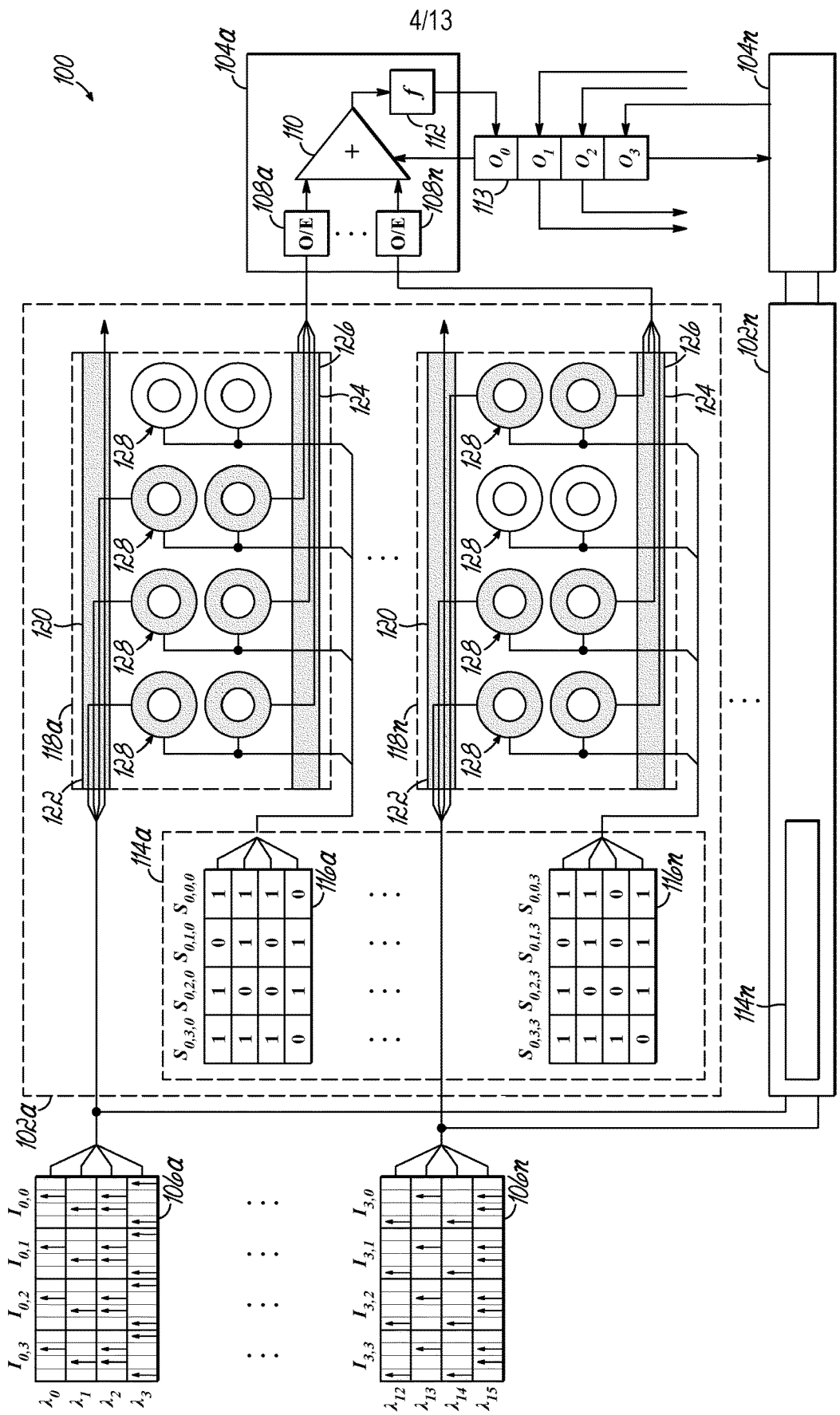
FIG. 5 is a schematic view of an exemplary hybrid neural network accelerator including optical AND units each employing optical logic gates of FIGS. 1 and 2.

FIG. 5 depicts an exemplary hybrid neural network accelerator 100 in accordance with an embodiment of the invention. The hybrid accelerator 100 uses a combination of photonic devices and electrical circuitry to implement the AND-shift and accumulate functionality. The hybrid accelerator 100 includes a plurality of optical multiplier units 102a-102n and a plurality of electrical processing units 104a-104n. Each optical multiplier unit 102a-102n receives one or more optical signals from each of a plurality of input neuron lanes 106a-106n, and outputs one or more optical signals to a respective electrical processing unit 104a-104n. The output of each electrical processing unit 104a-104n may include a plurality of optical-to-electrical (O/E) conversion units 108a-108n, a shift and accumulate unit 110, and an activation function unit 112. The activation function unit 112 may apply a non-linear function (e.g., a hyperbolic tangent function) to the output of the accumulate unit 110, and output an output neuron $O_k$ that is added to an output neuron lane 113.

Each optical multiplier unit 102a-102n may include a respective filter 114a-104n having a plurality of synapse lanes 116a-116n, and a plurality of optical AND units 118a-118n. Each optical AND unit 118a-118n includes an upper optical waveguide 120 that provides an optical input 122, a lower optical waveguide 124 that provides an optical output 126, and a plurality of optical microring resonators 128. Each optical microring resonator 128 may be configured as a resonant pair of microrings. Each resonant pair of microrings may be tuned to resonate at one of a plurality of wavelengths each corresponding to a wavelength used for wavelength-division multiplexing of optical signals received from the input neuron lanes 106a-106n. The optical microring resonators 128 may be configured to selectively couple optical signals having different wavelengths from the upper optical waveguide 120 to the lower optical waveguide 122 in response to signals from the synapse lanes 116a-116n.

The optical AND units 118a-118n may selectively couple of optical signals having certain predetermined wavelengths from the upper optical waveguide 120 to the lower optical waveguide 124. To this end, an optical signal propagating through the upper optical waveguide 120 may be coupled to the lower optical waveguide 124 when the optical microring resonator 128 tuned to its wavelength is activated by the synapse lane 116a-116n to which the optical microring resonator 128 is operatively coupled. In contrast, when the optical microring resonator 128 tuned to the wavelength of an optical signal propagating through the upper optical waveguide 120 is not activated by the synapse lane 116a-116n to which the optical microring resonator 128 is coupled, the optical signal may not be coupled to the lower optical waveguide 124. Thus, the optical signal emitted by the optical output 126 of each optical AND unit 118a-118n may only include the optical signals entering the optical input 122 having a wavelength which matches that of an activated optical microring resonator 128. The optical AND unit 118a-118n may thereby selectively multiplex the optical signals received from the input neuron lanes 106a-106n based on signals received from the synapse lanes 116a-116n.

The synapse lane 116a-116n may control the optical microring resonator 128 of the optical multiplier unit 102a-102n to which it is coupled, and represent an AND with a logic 1 input when the optical microring resonator 128 is activated, or an AND with a logic 0 input when the optical microring resonator 128 is deactivated. The number of wavelengths that each synapse lane 116a-116n filters may be correlated to the number of input neuron lanes 106a-106n. That is, the number of wavelengths λ used by the hybrid accelerator 100 may be equal to the number of lanes n used throughout the hybrid accelerator 100, e.g., four lanes. Once the optical AND has completed, the optical signal may continue on to the respective electrical processing unit 104a-104n. After undergoing an optical-to-electrical conversion, the AND values may begin the shift and accumulate process with a carry-lookahead adder and left bit-shifter. Once all light pulses in the neuron lanes have been transmitted to the optical multiplier units 102a-102n and ANDed with the outputs of the synapse lanes 116a-116n, and the optical output signals converted, multiplied, and accumulated in a respective electrical processing unit 104a-104n, the resulting accumulation may be transmitted to the activation function unit 112 before being transmitted to the output neuron lane 113.

By way of example, during cycle j=0, the optical AND unit 118a of optical AND unit 102a may receive a multiplexed signal $\Lambda=(\lambda_0+\lambda_1+\lambda_2+\lambda_3)$ from the input neuron lane 106a. Each bit of the input neuron $I_{0,0}$ may be transmitted by an optical signal having a distinct wavelength in a multiple-write-single-read configuration. In this configuration, input neuron lane 106a may transmit data with optical signals having wavelengths of $\lambda_0$-$\lambda_3$, the next two input neuron lanes may transmit data using optical signals having wavelengths of $\lambda_4$-$\lambda_7$ and $\lambda_8$-$\lambda_{11}$ (not shown), and input neuron lane 106n may transmit data with optical signals having wavelengths of $\lambda_{12}$-$\lambda_{15}$. Therefore, the multiplexed signals received by the optical AND units 118a-118n may comprise groups of optical signals having wavelengths from the group $\lambda_0$-$\lambda_{15}$.

Each optical AND unit 118a-118n may include a respective filter 114a-114n. The input neuron lanes 106a-106n may be operatively coupled to correspondingly numbered optical AND units 118a-118n, such that the optical AND unit 118a triggers input neuron lane 106a, and so on. As depicted in FIG. 5, during cycle j=0, input neuron lane 106a (e.g., lane i=0) serially transmits four bits per wavelength (e.g., $0010_2$, $0100_2$, $0110_2$, and $1001_2$ where a logic level 1 is depicted by an arrow indicating the presence of a light pulse) on each of four different physical channels (e.g., optical waveguides) such that the same information (16 bits total) is received by the optical AND unit 118a of each optical multiplier unit 102a-102n on the same wavelengths $\lambda_0$-$\lambda_3$. Likewise, optical AND unit 118n triggers input neuron lane 106n (e.g., lane i=3) to serially transmit four bits per wavelength (e.g., $1000_2$, $0010_2$, $1000_2$, and $0110_2$) on wavelengths 12-15, respectively, to the $n^{th}$ optical AND unit 118n in each optical multiplier unit 102a-102n.

In each optical multiplier unit 102a-102n, different synapse weights may be associated with each optical microring resonator 128 to create synapse lanes 116a-116n. The bitwise AND operation between the incoming neuron and synapse may occur on the appropriate wavelength. For example, on wavelength 3, the incoming neuron data is $1001_2$, and the optical microring resonator 128 is turned off (as indicated by a lack of shading). Because the optical microring resonator 128 is off, the incoming neuron data is not coupled to the lower optical waveguide 124, and $0000_2$ will appear on the lower optical waveguide 124 and be transmitted to the electrical processing unit 104a. This bitwise AND operation may occur such that the entire neuron datum is checked against a single synapse bit. In any case, the optical signals output by the optical multiplier unit 102a are received by the electrical processing unit 104a, where the optical signals undergo an optical-to-electrical conversion and are then added to the partial sum. Once all n cycles of the running sum are computed across the n synapse lanes, the result may be transmitted to the activation function unit 112 and then transmitted to the output neuron lane 113. The above technique reduces the optical-electrical multiply and accumulate units down to bitwise AND followed by shift and accumulate modeled after the Stripes design. So, for a synapse with p bits, the optical-electrical multiply and accumulate units multiply and accumulate requires p cycles to determine the partial sum for each synapse lane.

Figure 6:
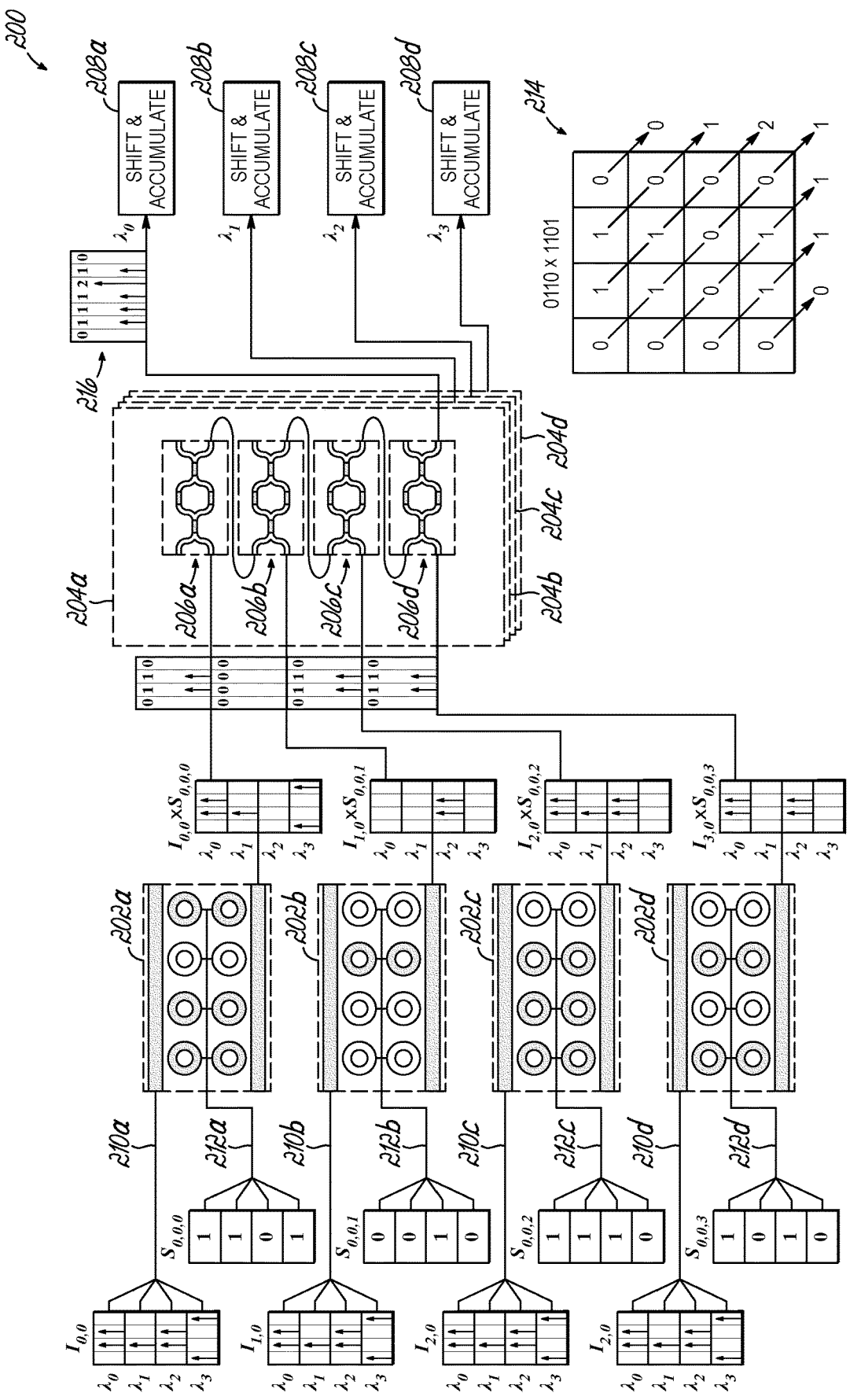
FIG. 6 is a schematic view of an optical neural network accelerator including the optical AND units of FIG. 5 and optical shift and accumulate units each employing optical interferometers of FIG. 3.

FIG. 6 depicts an exemplary optical neural network accelerator 200 including optical AND units 202a-202d and optical shift and accumulate units 204a-204d. It should be understood that not all elements of the accelerator 200 are shown in detail for the purpose of clarity. The optical AND units 202a-202d may use optical microring resonator based wavelength-division multiplexing to provide the logical AND operations as described above with respect to the hybrid accelerator 100. However, the optical shift and accumulate units 204a-204d may use Mach-Zehnder interferometers rather than electrical devices to provide a low-latency and low-power shift and accumulate functionality. To this end, each optical shift and accumulate unit 204a-204d may include a plurality of Mach-Zehnder interferometers 206a-206d arranged in a series configuration. Optical signals $I_{i,j} \times S_{i,j,k}$ output by the optical AND units 202a-202d may be operatively coupled to one of the lower or upper optical inputs (e.g., the lower optical input) of the interferometers 206a-206d. Within each optical shift and accumulate unit 204a-204d, the optical signal from the through output port (e.g., the lower optical output) of each earlier interferometer 206a-206c in the series configuration may be operatively coupled to the other of the upper or lower optical inputs (e.g., the upper optical input) of the later interferometer 206b-206d in the series configuration. The lower optical output of the latest interferometer 206d in the series configuration may be optically coupled to a respective shift and accumulate buffer 208a-208d. By cascading interferometers 206a-206d, the output of each optical AND unit 202a-202d may undergo pure optical shift and accumulate. Synchronization of the optical signals $I_{i,j} \times S_{i,j,k}$ output by the optical AND units 202a-202d with the propagation delay of the interferometers 206a-206d may allow an optical pulse train to be delayed by one bit cycle $t_{bit}$ in each interferometer 206a-206d. The delayed optical pulse train may then be added to the input optical signals $I_{i,j} \times S_{i,j,k}$ received at the lower optical input of the next interferometer 206b-206d.

For the purposes of simplicity and clarity, FIG. 6 only depicts input neuron lanes $I_{i,j}$ for i=0-3 and j=0, and synapse lanes $S_{i,j,k}$ for i=0, j=0, and k=0-3. However, it should be understood that the accelerator 200 may include neuron lanes $I_{i,j}$ for all cycles (e.g., j=0-3), and synapse lanes $S_{i,j,k}$ for all cycles j=1-3 and values of i=1-3. Moreover, as with the earlier descriptions of FIGS. 4 and 5, although the accelerator 200 is depicted for a value n=4, the size of accelerators in accordance with embodiments of the invention are not limited to any particular value of n.

The exemplary input neuron lanes $I_{i,j}$ are shown as being triggered for cycle j=0. In response to being triggered, each input neuron lane $I_{0,0}$, $I_{0,1}$, $I_{0,2}$, $I_{0,3}$ may simultaneously transmit a digital optical signal 210a-210d (e.g., $0110_2$, $0100_2$, $0110_2$, $1001_2$) in the form of light pulses at four different wavelengths $\lambda_0$, $\lambda_1$, $\lambda_2$, $\lambda_3$. These digital optical signals 210a-210d may be coupled to respective optical AND units 202a-202d. The same four wavelengths $\lambda_0$, $\lambda_1$, $\lambda_2$, $\lambda_3$ may be used by each input neuron lane $I_{0,0}$, $I_{0,1}$, $I_{0,2}$, $I_{0,3}$ in order to allow each of the optical shift and accumulate units 204a-204d to work at a specific wavelength $\lambda_0$, $\lambda_1$, $\lambda_2$, $\lambda_3$.

Concurrently with transmission of the input neuron values, synapse lanes $S_{0,0,0}$, $S_{0,0,1}$, $S_{0,0,2}$, $S_{0,0,3}$ of filter k=0 may transmit digital signals 212a-212d (e.g., discrete voltages) that selectively activate the optical microring resonators of respective optical AND units 202a-202d in accordance with the value of the synapse. Each optical AND unit 202a-202d may perform bitwise AND operations between the input neurons and each respective synapse as described above with respect to FIG. 5, and transmit the resulting optical signal to the optical shift and accumulate units 204a-204d. In the depicted embodiment, the output $I_{i,j} \times S_{i,j,k}$ of each optical AND unit 202a-202d at wavelength $\lambda_0$ may be transmitted to a corresponding optical input (e.g., the lower optical input) of a respective interferometer 206a-206d of the optical shift and accumulate unit 204a for wavelength $\lambda_0$. Selective filtering through wavelength-division multiplexing by the optical microring resonators may allow each wavelength $\lambda_0$-$\lambda_3$ associated with the synapse lanes $S_{i,j,k}$ to be independently selectively coupled to the lower optical input of a respective interferometer 206a-206d.

Continuing with the above example, wavelength $\lambda_0$ of optical outputs $I_{0,0} \times S_{0,0,0}$, $I_{0,2} \times S_{0,0,2}$, $I_{0,3} \times S_{0,0,3}$ may carry an n-bit digital value, e.g., $0110_2$. This value may be a result of the optical microring resonators for wavelength $\lambda_0$ in those optical AND units 202a, 202c, 202d being activated, as indicated by the shading of the optical microring resonators. Thus, the digital optical signals 210a-210d received from the corresponding input neuron lanes $I_{0,0}$, $I_{2,0}$, $I_{3,0}$ may be transmitted through the optical AND units 202a, 202c, 202d. In contrast, the optical output $I_{0,1} \times S_{0,0,1}$ may be another n-bit digital value, e.g., $0000_2$ (no light pulses) at least in part because the optical microring resonators for wavelength $\lambda_0$ in optical AND unit 202b are not activated, as indicated by the lack of shading. In any case, the optical output $I_{i,j} \times S_{i,j,k}$ of each optical AND unit 202a-202d may be fed to a respective interferometer 206a-206d of optical shift and accumulate unit 204a.

The output $I_{0,0} \times S_{0,0,0}$ of optical AND unit 202a at wavelength $\lambda_0$ may be operatively coupled to the earliest interferometer 206a of the serial configuration of interferometers 206a-206d. Likewise, the outputs $I_{1,0} \times S_{0,0,1}$, $I_{2,0} \times S_{0,0,2}$, $I_{3,0} \times S_{0,0,3}$ of optical AND units 202b-202d having wavelength $\lambda_0$ may be operatively coupled to respectively later interferometers 206b-206d in the serial configuration of interferometers 206a-206d. The upper and lower phase shifts $\varphi_{upper}$, $\varphi_{lower}$ of the interferometers 206a-206d may be configured so that the optical signals received by the upper and lower optical inputs are coupled to the lower optical output, and to prevent any optical signals from being coupled to the upper optical output.

Starting with the least significant bit (i.e., rightmost bit or bit 0) of each optical signal $I_{0,0} \times S_{0,0,0}$, $I_{0,1} \times S_{0,0,1}$, $I_{0,2} \times S_{0,0,2}$, $I_{0,3} \times S_{0,0,3}$ at wavelength $\lambda_0$ may enter the lower optical input of a respective interferometer 206a-206d at time t0, and exit the lower output of the respective interferometer at time $t_0 + t_{bit}$. During the next cycle at time $t_0 + t_{bit}$, the input of the latest interferometer 206d, bit 0 of optical signal $I_{0,3} \times S_{0,0,3}$ may emerge from the lower optical output of the latest interferometer 206d. During this cycle, bit 0 of optical signal $I_{0,2} \times S_{0,0,2}$, and bit 1 of optical signal optical signal $I_{0,3} \times S_{0,}$ $_{0,3}$ may be entering the upper and lower optical inputs of the latest interferometer 206. Thus, at subsequent time $t_0 + 2 \times t_{bit}$, bit 1 of optical signal $I_{0,3} \times S_{0,0,3}$ at wavelength $\lambda_0$ may emerge from the lower optical output of the latest interferometer 206d concurrently with bit 0 of optical signal $I_{2,0} \times S_{0,0,2}$. This shift and addition of optical signals may continue for each cycle and interferometer 206a-206d. Thus, the output of the optical shift and accumulate unit 204a may provide the shift and accumulate function 214.

By selecting the length of the optical waveguide coupling the lower optical output of each earlier interferometer 206a-206c to the upper optical input of the next latest interferometer 206b-206d equal to the bit transmission period $t_{bit}$, sequential bits may be combined at the lower optical output of the later interferometer 206b-206d so that the resulting output signal 216 is the sum of the amplitudes of the optical signals corresponding to the sequential bits. The output signal 216 may be operatively coupled to an optical-to-electrical signal converter, and the final accumulated value stored in the shift and accumulate buffer 208a for transmission to the activation function circuit.

Figure 7:
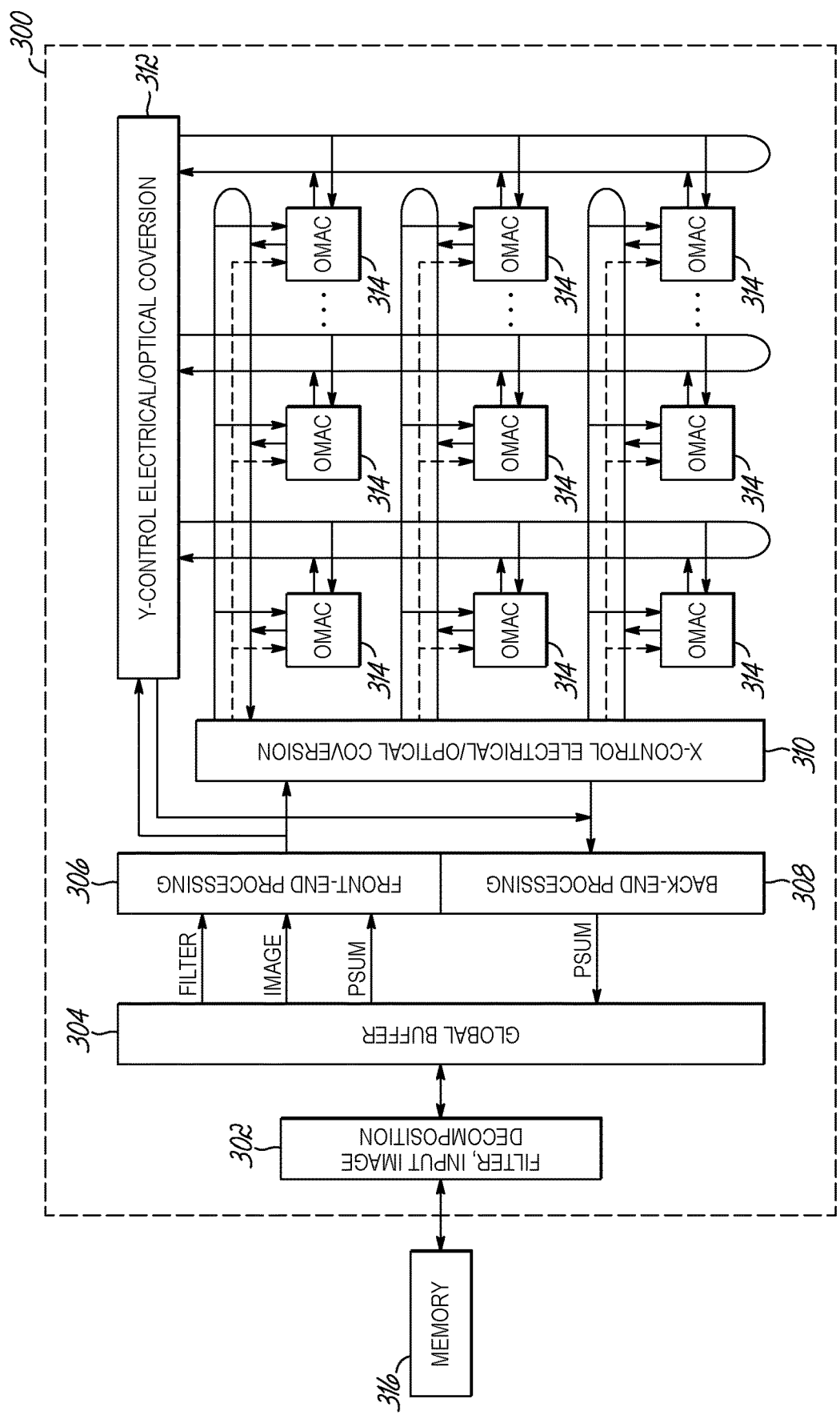
FIG. 7 is a schematic view of an exemplary photonic neural network including one or more of the hybrid accelerator of FIG. 5 or the optical accelerator of FIG. 6.
Figure 8:
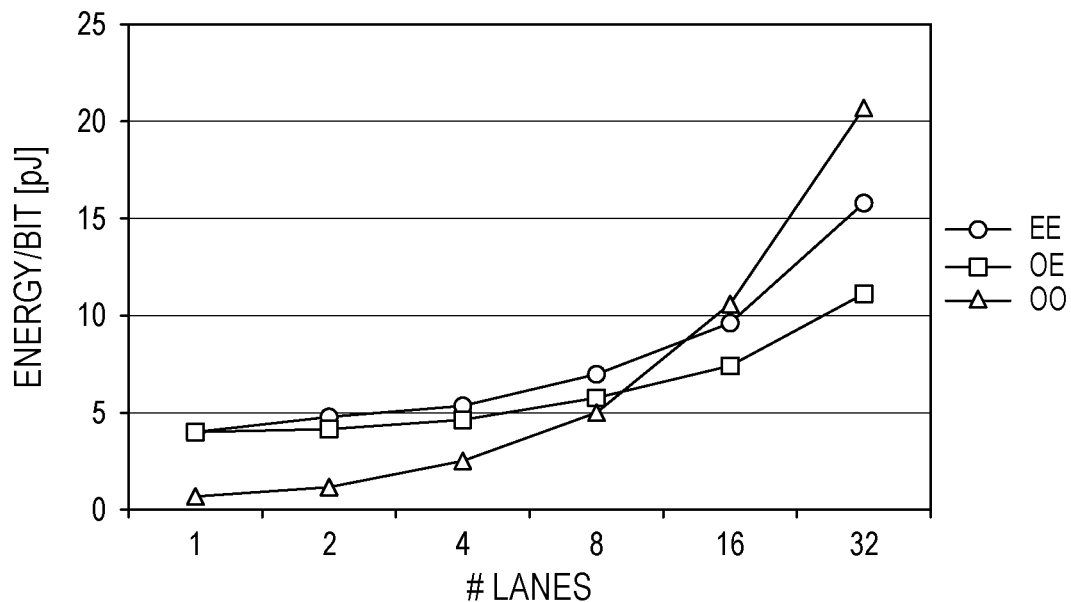
FIGS. 8-13 are graphical views of an amount of energy per bit for electrical, hybrid, and optical multiply and accumulate units for 1, 2, 4, 8, 16, and 32 bits per lane.
Figure 9:
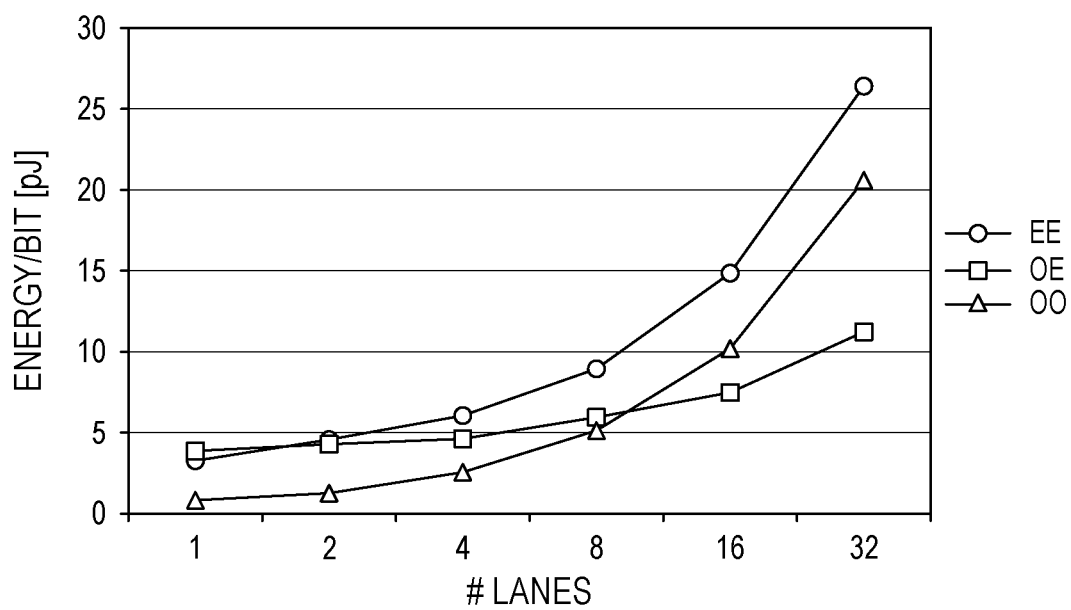
Figure 10:
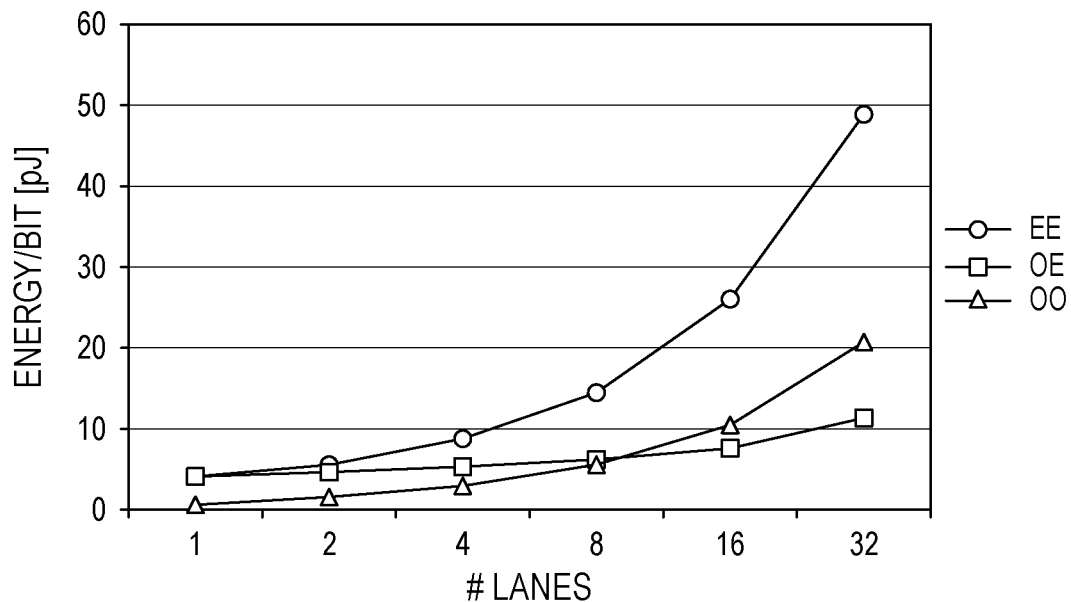
Figure 11:
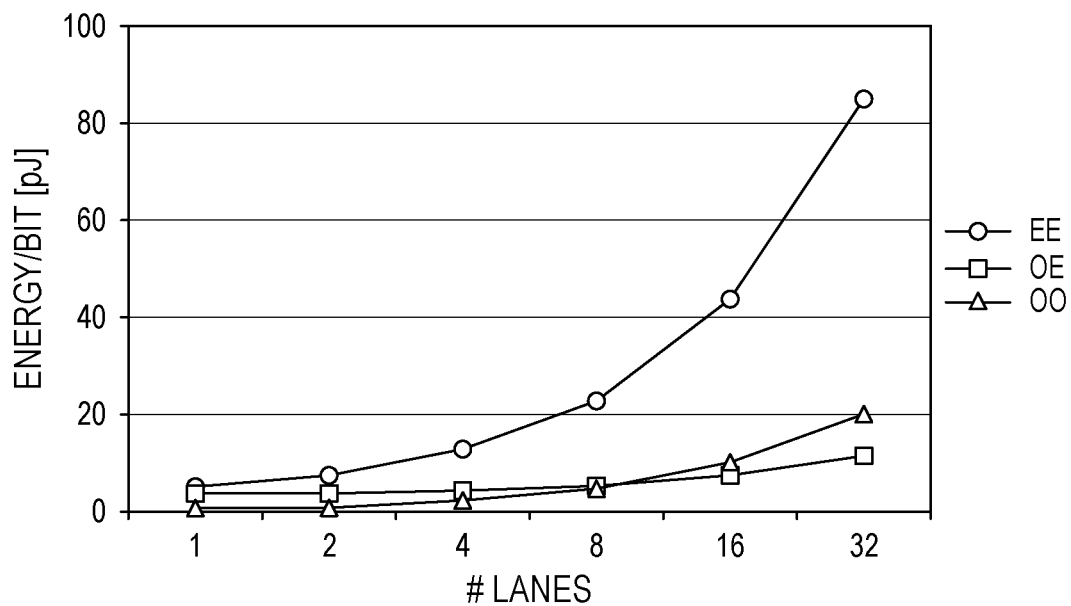
Figure 12:
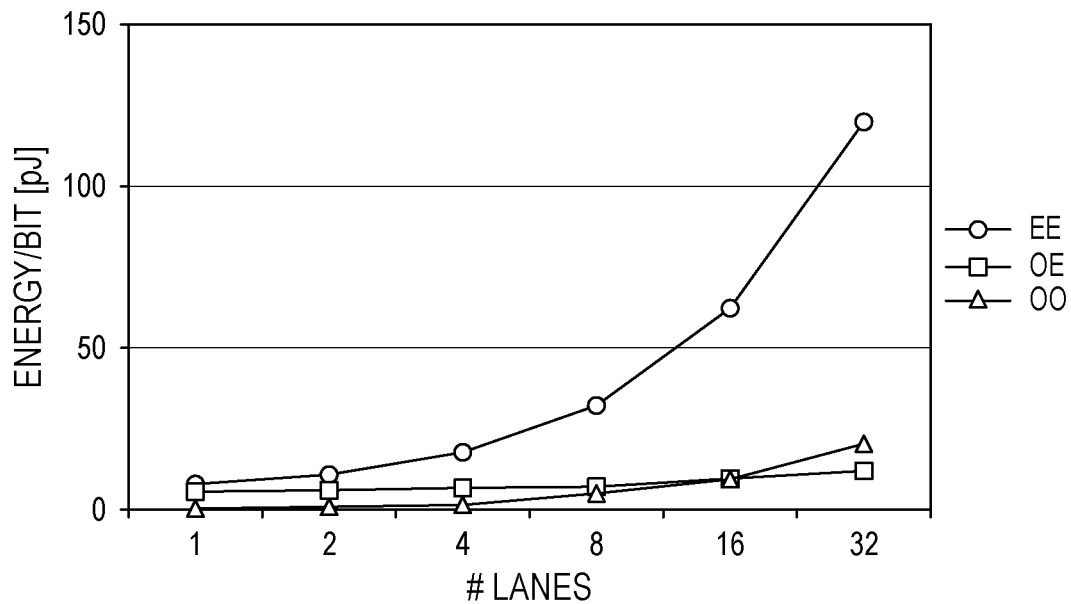
Figure 13:
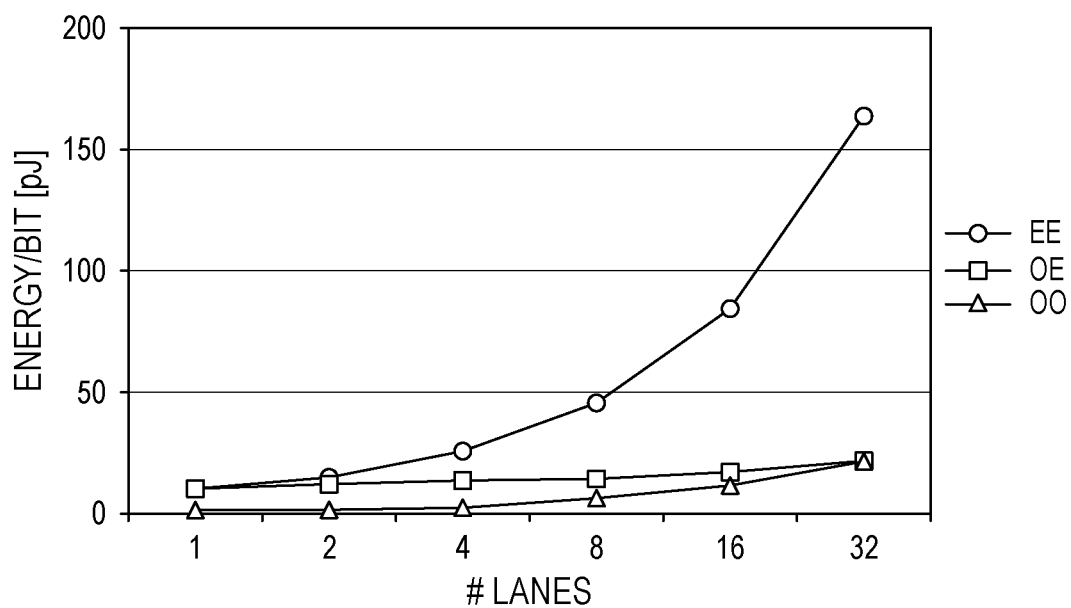

FIG. 7 depicts an exemplary photonic neural network 300 in accordance with an embodiment of the invention. The neural network 300 includes a filter input image decomposition unit 302, a global buffer 304, a front end processing unit 306, a back-end processing unit 308, an x-control electrical/optical conversion unit 310, a y-control electrical/optical conversion unit 312, a plurality of optical multiply and accumulate accelerators 314, and is operatively coupled to an external memory 316. Each multiply and accumulate accelerator 314 may include a register file that stores filter weights, and a multiply and accumulate unit that implements multiply and accumulate functions as described above. Neurons may be fired with photonic interconnects using both x- and y-dimensions. Front-end pre-processing of the data may be used to fire the neurons repeatedly if needed, and back-end processing of data may be used to recover the information from the accumulation. The synapses may be pre-loaded into the optical multiply and accumulate accelerators 314, and the exemplary design assumes timed firing of the neurons to implement the multiply and accumulate functionality.

The exemplary photonic neural network 300 has several advantages over conventional neural networks. For example, all neuron firing and partial sums accumulation are in the optical domain, which significantly reduces energy consumption. Although filter weights may be pre-loaded to drive the optical microring resonators, photonics can be used to send the weight information on a specific channel to the optical multiply and accumulate accelerators 314. Another advantage is that the architecture is scalable since the photonic drivers and receivers are located at x- and y-dimension electrical-to-optical and optical-to-electrical conversion. Except for active optical microring resonators, all other components may be passive. Thus, the neural network 300 may be scaled up by driving the optical signals with higher intensity. Yet another advantage is the two-dimensional connectivity, which may allow each row or column to be individually utilized/driven to solve a neural network problem.

Experimental Results

Simulations were performed to evaluate the parameters of implementing photonic neural network accelerator architectures in accordance with the above described accelerators. Characteristics evaluated include power consumption, delay, and circuit area. To evaluate the energy, area, and latency of each design, an accurate understanding and description of each component was determined. Through simulation of each hardware component, multiply and accumulate units can be constructed to see how these parameters change with respect to the number of lanes and the number of bits per lane.

To evaluate the electrical device hardware parameters, gate-counts were determined for each component. Once the gate counts for each component were determined, energy, area, and latency numbers were calculated using technology parameters in a Design Space Exploration of Networks Tool (DSENT) simulator. DSENT simulators are described in detail in "DSENT—A Tool Connecting Emerging Photonics with Electronics for Opto-Electronic Networks-on-Chip Modeling," C. Sun et al., 2012 *IEEE/ACM Sixth International Symposium on Networks-on-Chip*, May 2012, pp. 201-210, the disclosure of which is incorporated by reference herein in its entirety. Single gates up to full devices and interconnects were simulated using a bulk 22 nm low-voltage threshold model in DSENT. This model was used for electrical component simulation in the electrical and optical-electrical multiply and accumulate units, and optical multiply and accumulate unit designs.

For example, the gate count (GC) and gate level depth (LD) for a carry-lookahead adder for a given number of bits can be determined by the following equations:

$$GC(n) = \frac{n^3 + 6n^2 + 47n}{6} \quad (5)$$

$$LD(n) = 4 + 2[\log_2(n-1)] \quad (6)$$

For n=8 bits, the above equations yield a gate count of 212 and gate level depth of 10. The 22 nm model in DSENT indicates that 212 gates occupy approximately 0.07 nm² and consume 0.17 µW of power. The latency of the carry-lookahead adder can be estimated using the propagation delay of the bulk 22 nm low-voltage threshold model in conjunction with the level depth of the design. With a gate level depth of 10, the 8-bit carry-lookahead adder is estimated to have a propagation delay of about 2.95 ns.

Optical microring resonators have been demonstrated with footprints corresponding to a ring radius r=7.5 µm. Microring-based wavelength-division multiplexing arrays have also been shown to consume as little as 100 fJ/bit at 10 Gb/s. Based on these known parameters, certain characteristics of the wavelength-division multiplexing array used in the optical AND, optical-electrical multiply and accumulate, and optical multiply and accumulate embodiments have been estimated. For example, given the above radius of the optical microring resonator, the path length that the optical signal travels can be determined. In the optical AND configuration, when a given wavelength is coupled to appropriately tuned optical microring resonators for that wavelength, the signal must pass around both optical microring resonators to preserve the path direction shown in FIG. 2. The path length travelled by an optical signal through both optical microring resonators can be approximated using the S-shaped curved shown, which is about two half-circumferences, or one circumference total, in length. Thus, not including the path length to bring the signal in or out of the optical microring resonator array, the optical signal will need to travel 2π(7.5 µm), or about 47.1 µm.

With the path length known, the delay an optical signal will experience passing through the optical microring resonator can be determined. Silicon has a refractive index $n_{Si}$=3.48 at λ=1550 nm. Using this value and a path length d=47.1 µm, the delay $t_{MMR}$ can be determined as:

$$t_{MRR} = d\left(\frac{n_{Si}}{c}\right) = 0.547 \text{ ps} \quad (7)$$

where c is the speed of light in free-space.

Mach-Zehnder interferometers have been shown to be highly energy efficient optical solutions to modulation, with some designs demonstrating energy consumption as low as 32.4 fJ/bit. For an embodiment of the present invention, the phase shifters 46, 48 of Mach-Zehnder interferometer 40 may be 2 mm long. In order to synchronize cascaded Mach-Zehnder interferometers 40 having these dimensions to the optical pulse frequency, a precisely measured path may be placed from the optical output of the earlier (i.e., preceding) Mach-Zehnder interferometer to the optical input of the later (i.e., following) Mach-Zehnder interferometer. This distance can be determined by one of the following equations:

$$d_{path} = \frac{c(T_o - t_{MZI})}{n_{Si}} \quad (8)$$

or $$d_{path} = \frac{c}{n_{Si} f_o} - d_{MZI} \quad (9)$$

Where $T_o$ is the optical period $1/f_o$, $t_{MZI}$ is the propagation delay of the Mach-Zehnder interferometer, and $d_{MZI}$ is the path length of the Mach-Zehnder interferometer. For phase shifters having a length of 2 mm, the length between Mach-Zehnder interferometers at 10 GHz can be determined to be d=6.77 mm. The number of Mach-Zehnder interferometers for a given wavelength may be the same as the number of bits that the wavelength carries. So, to accumulate n optical pulses on a single wavelength, the total accumulation length may be determined to be:

$$d_{tot} = (n)d_{MZI} + (n-1)d_{path} \quad (10)$$

Thus, the total propagation delay for the accumulation of 4-bit optical pulses may be determined as:

$$t_{tot} = (8 \times (2 \text{ mm}) + 7 \times (6.77 \text{ mm}))\left(\frac{n_{Si}}{c}\right) = 0.736 \text{ ns} \quad (11)$$

Several different convolutional neural network architectures (VGG16, AlexNet, ZFNet, ResNet-34, LeNet, GoogLeNet) were simulated in MATLAB to perform a per-layer analysis of the number of computations (matrix-vector-multiplications, multiplications, additions, activation functions) required for the inference phase of the network. The output shape (height, width, channels) was computed for each convolutional layer. The output feature size can be determined as:

$$E = \frac{H - R + U}{U} \quad (12)$$

where H is the input feature size, R is the filter kernel size, and U is the stride size. Depending on the convolutional neural network architecture, padding may be added in accordance with the specifications of the architecture.

The number of matrix multiplications required may be determined using the output feature size $N_{MVM}=E^2MC$, where M is the number of filters used in the convolutional layer and C is the number of input channels. Next, the number of individual multiplications may be determined as:

$$N_{mul}=R^2(N_{MVM}) \quad (13)$$

the number of additions may be determined as:

$$N_{add}=N_{mul}+E^2M \quad (14)$$

and the number of activation functions may be determined as:

$$N_{act}=E^2M \quad (15)$$

By way of example, the first convolutional layer ($CONV_1$) of a VGG16 model may have 64 filters with a kernel shape of (3,3), and the input shape fed to $CONV_1$ may be (224,224,3), which produces the following results:

$$N_{MVM}=224^2(64)(3)=9,633,792 \quad (16)$$

$$N_{mul}=3^2(N_{MVM})=86,704,128 \quad (17)$$

and so on. Table I shows the per-layer analysis of VGG16 utilizing the calculations listed above.

With all components of the multiply and accumulate units simulated to get their energy/bit, area, and propagation delays, plus the convolutional neural network architecture operations, an overall evaluation of the convolutional neural network accelerator designs can be performed.

Using the optical-electrical multiply and accumulate unit design depicted by FIG. 5 as an example for the AND shift and accumulate of two 4-bit words in all lanes as shown, the number of lanes is four, and the number of bits per wavelength (bits per lane) is also four. So, for a given wavelength, a synapse lane of p four bits requires four cycles to compute the partial sum. This happens for all 16 wavelengths $\lambda_0 - \lambda_{15}$. The number of optical microrings in the entire design is therefore 128, i.e., 64 optical microring resonator filters.

TABLE I

| Layer | VGG16 Computations (millions) | | | | |
|---|---|---|---|---|---|
| | MVM | Mul | Add | Act | Input Shape |
| Conv1 | 9.63 | 86.7 | 89.9 | 3.21 | [224, 224, 3] |
| Conv2 | 206 | 1850 | 1853 | 3.21 | [226, 226, 64] |
| Conv3 | 103 | 925 | 926 | 1.61 | [114, 114, 64] |
| Conv4 | 206 | 1850 | 1850 | 1.61 | [114, 114, 128] |
| Conv5 | 103 | 926 | 926 | 0.803 | [58, 58, 128] |
| Conv6 | 206 | 1850 | 1850 | 0.803 | [58, 58, 256] |
| Conv7 | 103 | 925 | 925 | 0.401 | [30, 30, 256] |
| Conv8 | 206 | 1850 | 1850 | 0.401 | [30, 30, 512] |
| Conv9 | 51.4 | 462 | 463 | 0.100 | [16, 16, 512] |
| Conv10 | 51.4 | 462 | 463 | 0.100 | [16, 16, 512] |
| FC1 | $10^{-6}$ | 629 | 1259 | 629 | [25088] |
| FC2 | $10^{-6}$ | 16.8 | 33.6 | 16.8 | [4096] |
| FC3 | $10^{-6}$ | 16.8 | 33.6 | 16.8 | [4096] |

It takes only four cycles to compute sixteen 4-bit AND functions, and (excluding laser power for now) the optical microring resonators will consume about 128×500 fJ×4 bits×4 cycles=1.024 nJ. After the optical-to-electrical conversion in the electrical processing unit, the bits are accumulated. A 4-bit carry-lookahead adder may have 58 gates, in which case at 1 GHz using the bulk 22 nm low-voltage threshold model, all carry-lookahead adders in the design may consume a total of 5.06 pJ. This type of analysis was done for every component in the design, including the laser sources, optical-to-electrical converters, bit-shifters, and activation functions.

Once the energy consumption for each device is added up with interconnect overhead, the overall energy consumption for the optical-electrical multiply and accumulate design can be computed. Then pulling from the convolutional neural network computations performed earlier, the number of repetitions needed can be determined from the number of matrix-vector-multiplications, as well as the energy consumption for every multiply, add, and activation function of the convolutional neural network architecture. Combining all of these gives the comprehensive performance of the accelerator for each convolutional neural network architecture on a per-layer basis.

FIGS. 8-13 depict graphs illustrating the energy per bit for the electrical, hybrid, and optical multiply and accumulate accelerator designs. The energy consumption for each type of accelerator was computed from the device level up, and both the number of lanes and the number of bits per lane were varied to see how each design responded to the respective scaling. As can be seen from the graphs, the energy per bit for the electrical design (EE) grows when scaling up both the number of lanes and the number of bits per lane. As the number of bits per lane is increased, it can further be seen that the energy per bit rises more slowly for both the hybrid (OE) and optical (OO) multiply and accumulate designs as compared to the electrical design. This reduction in power consumption growth is because the number of optical devices (e.g., the optical microring resonator) does not increase with the number bits per lane. Rather, the number of optical devices increases with respect to the number of lanes, i.e., wavelengths. Thus, low power consumption is favored by optical designs in which the number of bits per lane is larger than the number of lanes. For example, in the optical multiply and accumulate design, energy per bit drops drastically due to the increase in the bits per lane provided by the Mach-Zehnder interferometer's efficient accumulation ability.

Figure 14:
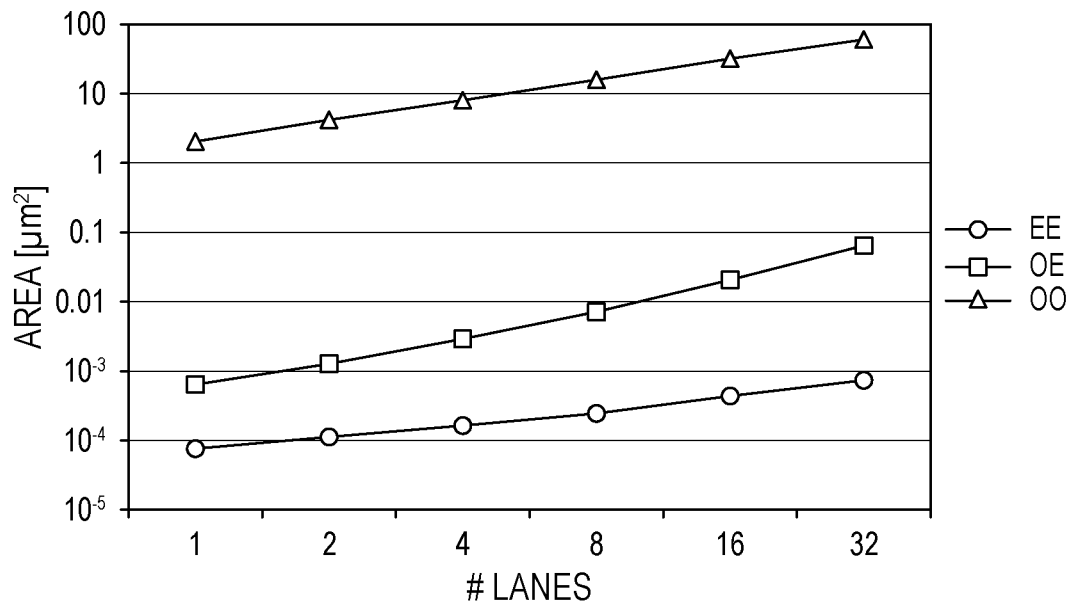
FIG. 14 is a graphical view of area verses number of lanes for exemplary electrical, hybrid, and optical neural network accelerators.

FIG. 14 depicts a graph illustrating how the area of each design scales in response to changes in the number of lanes. It can be seen that the all-electrical design occupies the least amount of area. This can be expected as the 22 nm model used allows complex logic to remain in a small amount of space, and optical components are relatively large as compared to the logic gate size of 22 nm technology. For a logical AND function, optical microring resonators occupy a considerably larger amount of area than the electrical implementation. Mach-Zehnder interferometers are the largest device used in these designs, and as seen in the optical multiply and accumulate unit curve, their cascaded configuration contributes to a much larger area than both of the other designs. For example, in embodiments with four lanes and four bits per lane, the optical-electrical multiply and accumulate unit occupied 2.78 nm² more area than the all-electrical unit, and the optical multiply and accumulate unit occupied 7.98 μm² more area than the all-electrical unit.

Figure 15:
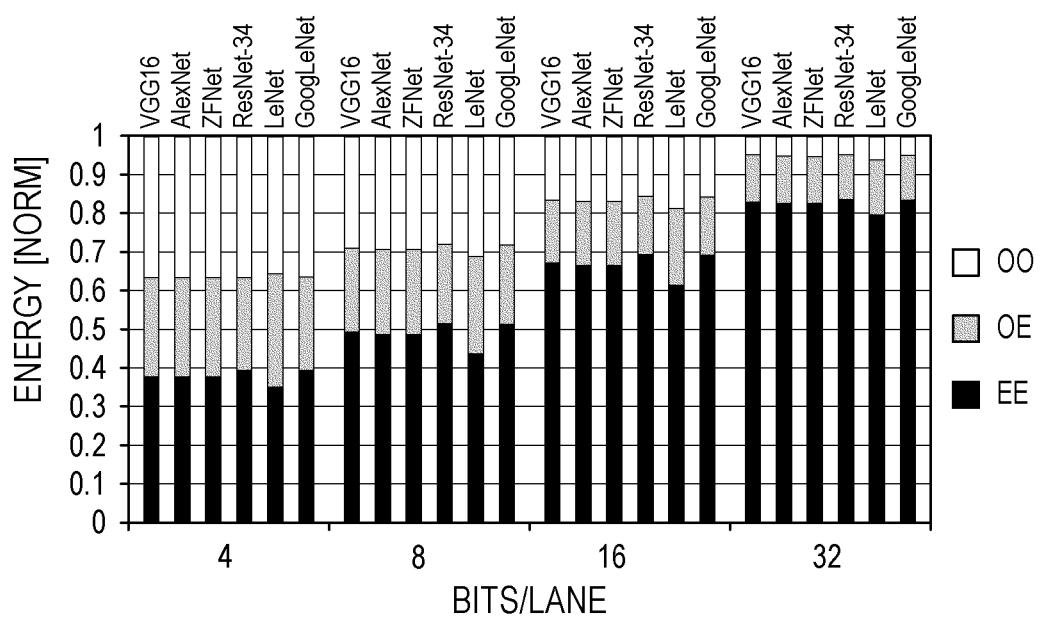
FIG. 15 is a graphical view of normalized energy for VGG16, AlexNet, ZFNet, ResNet-34, LeNet, and GoogLeNet models of neural network accelerators having 4, 8, 16, and 32 bits per optical signal wavelength used.

FIG. 15 depicts a bar-graph illustrating a normalized energy consumption for the convolutional neural network architectures, and demonstrates each design's scaling response to changes in the number of bits per lane. The simulation energy results across the simulated convolutional neural network architectures show very promising numbers for both the hybrid optical-electrical multiply and accumulate unit and the optical multiply and accumulate unit designs. Both hybrid optical-electrical multiply and accumulate unit and optical multiply and accumulate unit designs begin to outperform the electrical designs when the number of bits per lane is greater than the number of lanes. The offset allows the optical designs to utilize more optical pulses through their existing structures. Increasing the number of optical pulses may be used rather than increasing the number of wavelengths to allow increased capacity accelerators without increasing the number of optical devices. It can be seen that when the number of bits per lane is much greater than the number of lanes (e.g., 32 bits per lane in 8 lanes), the all-electrical embodiments consumes a majority of the relative energy, while the optical multiply and accumulate embodiments have a relatively small energy consumption.

Figure 16:
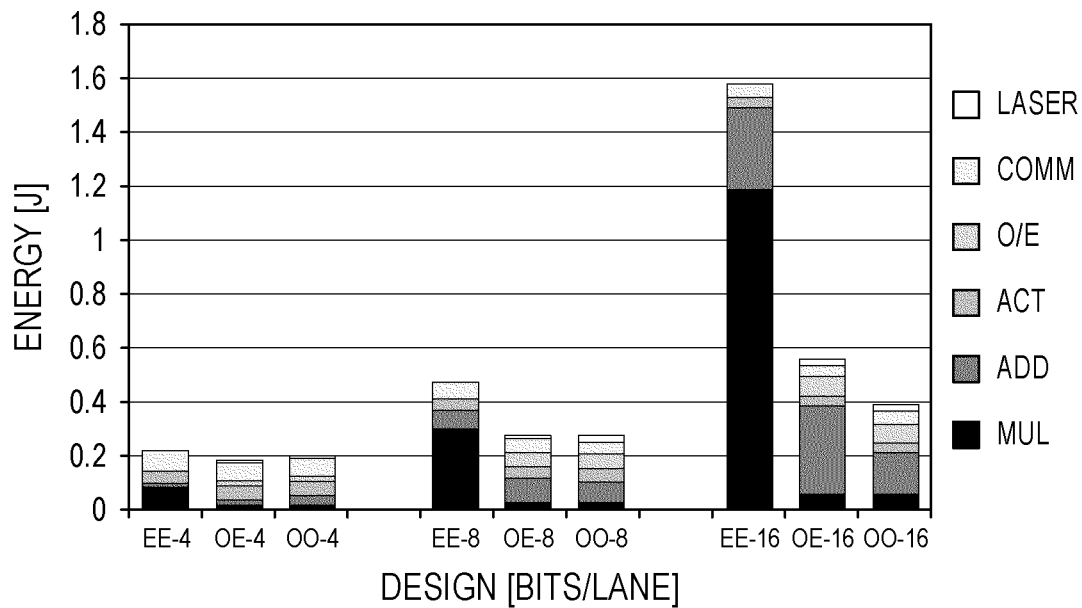
FIGS. 16-18 are graphical views of energy consumption per component for VGG16, AlexNet, ZFNet, ResNet-34, LeNet, and GoogLeNet models of electrical, hybrid, and optical accelerators.
Figure 17:
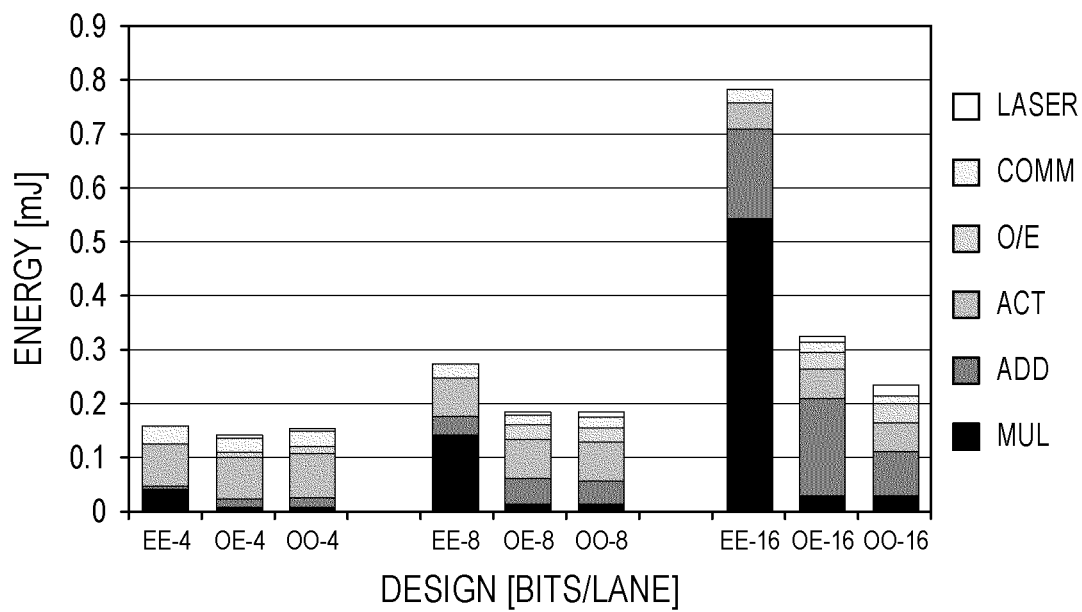
Figure 18:
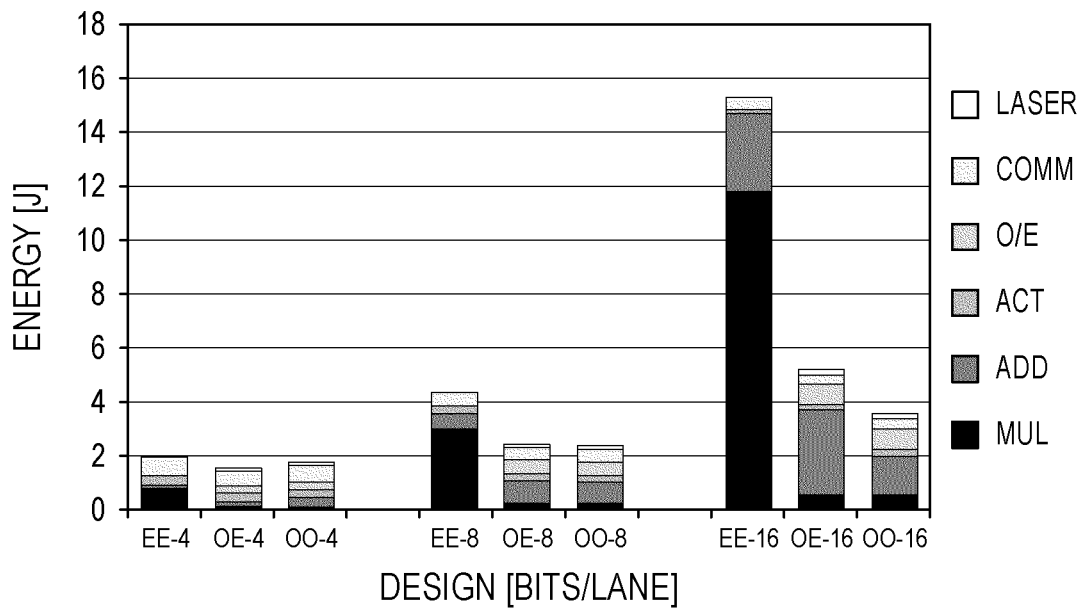

FIGS. 16-18 depict bar-graphs illustrating energy consumption per component for AlexNet (FIG. 14) LeNet (FIG. 15), and VGG16 (FIG. 16) for electrical, hybrid, and optical 4-lane architectures for laser, communication, optical-electrical conversion, activation, addition, and multiplication functional units for 4, 8, an 16-bits per lane. The analysis of each step in the acceleration design can be seen in the bar graphs, and shows how the laser source and optical-electrical conversion in hybrid multiply and accumulate and optical multiply and accumulate units contribute to the total energy consumption.

For example, the 16 bit/lane group in the plot depicted by FIG. 15 shows that for multiplication, the optical microring resonators in the hybrid and optical multiply and accumulate units provide high efficiency, consuming a mere 5.1% of the energy that the electrical unit consumes. For addition functions, both the electrical and hybrid multiply and accumulate units have similar energy efficiencies since they both use electrical shift and accumulate devices. In contrast, the optical microring resonators in the optical units reduce the energy consumed for addition by 53.8% over hybrid multiply and accumulate units. The activation function circuitry is the same for all designs, so this portion of the neural network has a consistent demand for energy. Likewise, the energy required for transmitting and receiving data at the units is relatively consistent between system types. For the electrical embodiments, an electrical link may be used to both receive and transmit data. The hybrid multiply and accumulate units and optical designs may use a photonic link to receive data from laser sources, and an electrical link to transmit processed data out. The photonic link in the hybrid multiply and accumulate units and optical designs may consume slightly less energy than the electrical link over a short distance.

The hybrid optical-electrical multiply and accumulate units do well when compared to the electrical multiply and accumulate units. However, the effect of the electrical processing unit of the hybrid multiply and accumulate unit for the shift and accumulate functionality becomes apparent for higher bits per lane. In the case of the optical accelerator, the highly efficient Mach-Zehnder interferometers respond well to changes in the bits per lane, such that the optical accelerator has the lowest energy consumption design at higher numbers of bits per lane.

Figure 19:
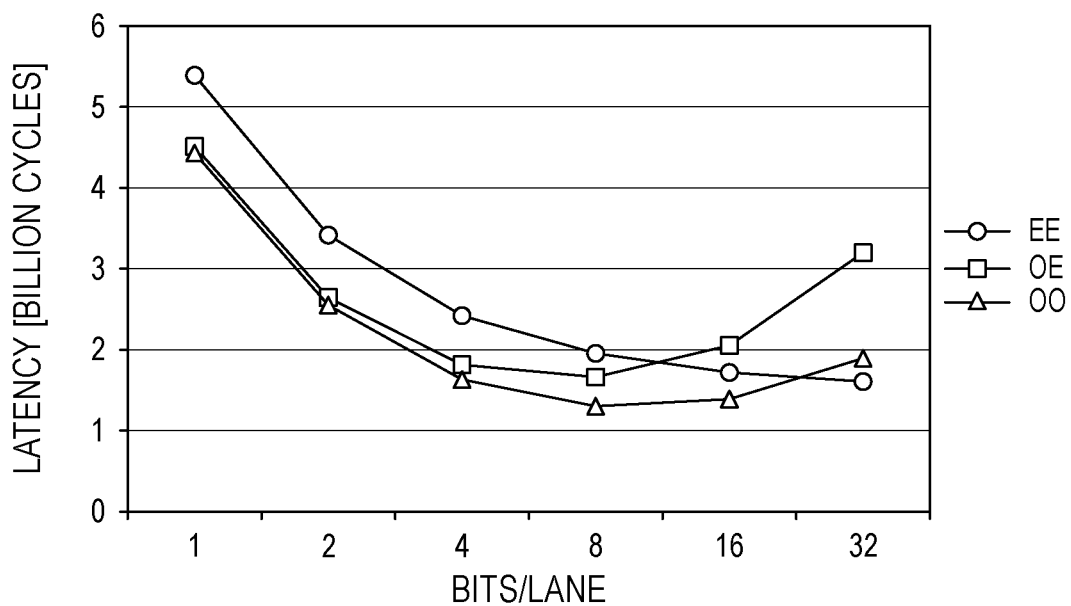
FIG. 19 is a graphical view of average latency verses the number of bits per lane for electrical, hybrid, and optical neural network accelerators having 8 lanes.

Latency is another consideration for real-time convolutional neural network inferences. Advantageously, embodiments of the present invention keep latency to a minimum. FIG. 19 depicts a graph illustrating geometric mean latency verses bits per lane for an eight-lane accelerator. It can be seen that as the number of bits per lane is increased, the latency begins to fall. The latency for the electrical accelerator consistently declines with increasing bits per lane. In contrast, the latencies for each of the hybrid and optical accelerators have a U-shaped response. The latency for hybrid and optical multiply and accumulate units begins to rise again as the larger bit count pushes the propagation delays over a one cycle threshold. That is, only a certain amount of pulses can be transmitted during a single 10 GHz cycle of the optical signals before extra cycles are required to process this data.

Figure 20:
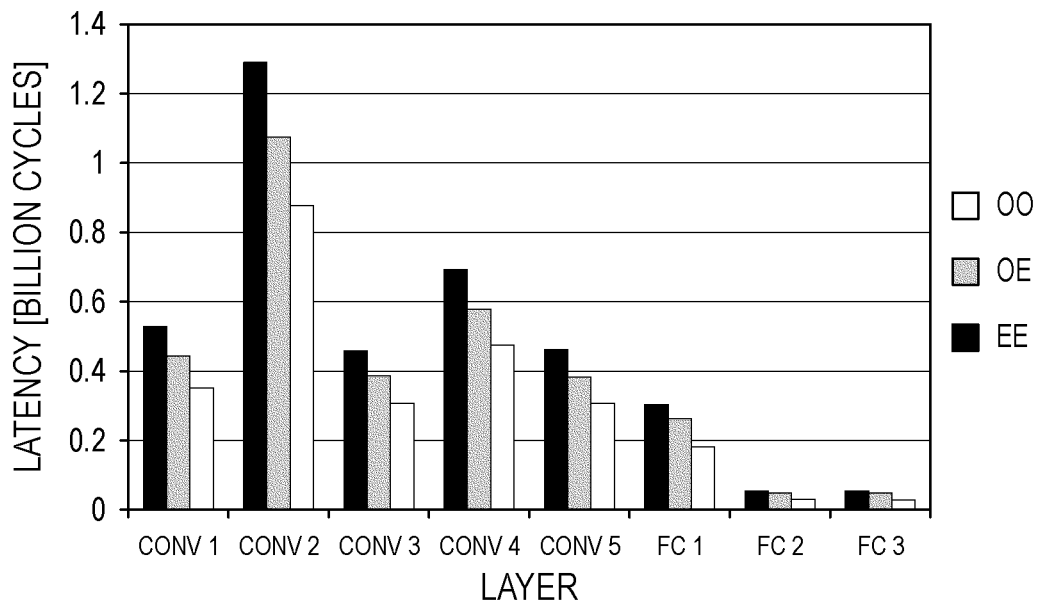
FIG. 20 is a graphical view of average latency for different layers in electrical, hybrid, and optical neural network accelerators having 8 lanes and 8 bits per lane.

It is also desirable to see the latency response on a per-layer basis for the convolutional neural network architectures. As an example, FIG. 20 depicts a bar graph of the latency for each layer of a ZFNet neural architecture having eight lanes with eight bits per lane. The relative difference in latency between the three accelerator designs is consistent, and demonstrates that embodiments of the invention scale well to accommodate varying input sizes. The hybrid and optical multiply and accumulate units do well in latency for this configuration, with the optical design having the least delay. For large convolutional layers like $CONV_2$, the absolute difference between the optical and the hybrid and electrical designs may be significant, while in less computationally demanding layers like the fully-connected layers, the absolute difference may not be as great. For example, for the $CONV_2$ layer, the optical multiply and accumulate units are 31.9% faster than the electrical multiply and accumulate units, and 18.6% faster than the hybrid multiply and accumulate units.

Figure 21:
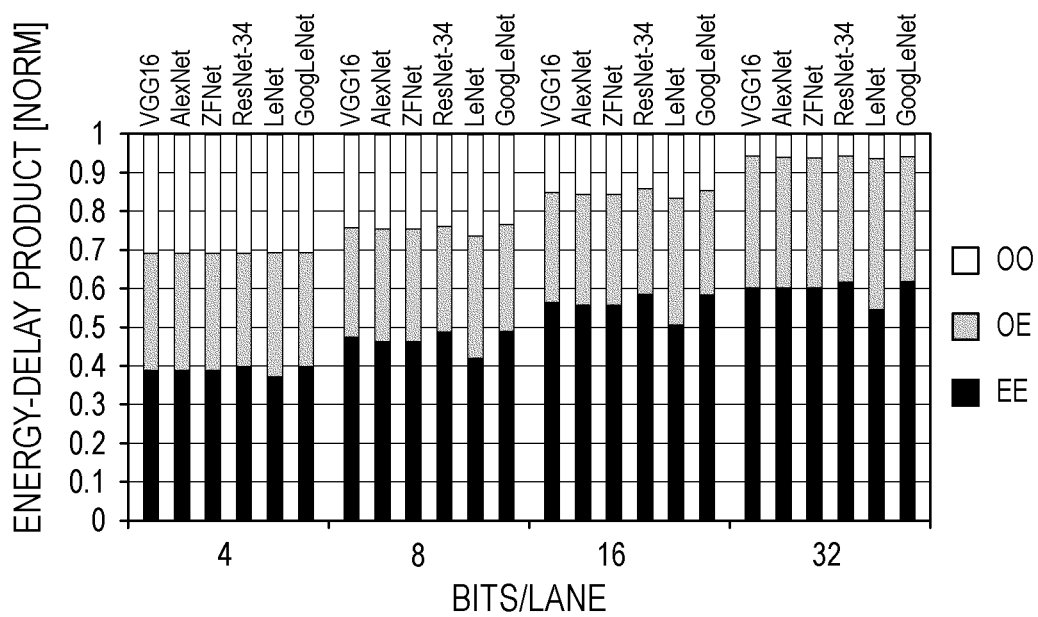
FIG. 21 is a graphical view of the energy-delay product for VGG16, AlexNet, ZFNet, ResNet-34, LeNet, and GoogLeNet models of neural network accelerators having 4, 8, 16, and 32 bits per optical signal wavelength used.

The energy-delay product is another useful parameter for characterizing the performance advantages of embodiments of the invention with respect to energy consumption and latency. FIG. 21 depicts a bar graph illustrating the normalized energy-delay product for each of the six convolutional neural network architectures for 4, 8, 16, and 32 bits per lane. It can be seen that the optical design has the greatest advantage over the other designs when the number of bits per lane is relatively high. Even considering the U-shape of the latency curve for the optical design, the optical design is still able to outperform the hybrid and electrical designs due to its high energy efficiency. The energy-delay product for the electrical design scales quickly with increasing bits per lane, as does the hybrid design. However, the optical design remains low as the bits per lane is scaled up, and remains resilient to changes in the input data size. For accelerators having 4 lanes with 16 bits per lane, the geometric mean of the energy-delay product of the optical accelerator is 73.9%, and the hybrid accelerator is 48.4% better, than the electric accelerator. This provides a clear indication of the advantages in energy consumption provided by optical microring resonators combined with the low-latency Mach-Zehnder interferometers.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the text of the specification, flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A processing element for a neural network accelerator, comprising:
    a first synapse lane configured to output a first electrical signal indicative of a value of a first synapse during a first cycle of an output neuron calculation; and
    a first optical AND unit including:
        a first electrical input operatively coupled to the first synapse lane,
        a first optical input configured to receive a first optical signal indicative of the value of a first input neuron transmitted during the first cycle of the output neuron calculation,
        a first optical output, and
        a first optical microring resonator configured to selectively couple the first optical signal from the first optical input to the first optical output based at least in part on a characteristic of the first electrical signal.

2. The processing element of claim 1, wherein:
the first synapse lane is further configured to output a second electrical signal indicative of the value of a second synapse during the first cycle of the output neuron calculation;
the first optical input is further configured to receive a second optical signal indicative of the value of a second input neuron transmitted during the first cycle of the output neuron calculation; and
the first optical AND unit further includes:
a second electrical input operatively coupled to the first synapse lane, and
a second optical microring resonator configured to selectively couple the second optical signal from the first optical input to the first optical output based at least in part on the characteristic of the second electrical signal.

3. The processing element of claim 2, wherein:
the first optical signal has a first wavelength;
the second optical signal has a second wavelength different from the first wavelength;
the first optical microring resonator is configured to resonate at the first wavelength when the characteristic of the first electrical signal causes the first optical microring resonator to couple the first optical signal from the first optical input to the first optical output; and
the second optical microring resonator is configured to resonate at the second wavelength when the characteristic of the second electrical signal causes the second optical microring resonator to couple the second optical signal from the first optical input to the first optical output.

4. The processing element of claim 1, further comprising:
an electrical processing unit that includes:
a shift and accumulate unit having an electrical input configured to receive a product of the first input neuron and the first synapse, and an output configured to output a sum of the products received during each cycle of the output neuron calculation; and
an optical-to-electrical conversion unit having an optical input operatively coupled to the first optical output of the first optical AND unit, and an electrical output operatively coupled to the electrical input of the shift and accumulate unit.

5. The processing element of claim 4, further comprising:
an activation function unit configured to receive the sum of the products from the shift and accumulate unit, and output an output neuron.

6. The processing element of claim 5, wherein the activation function unit applies a hyperbolic tangent function to the sum of the products.

7. The processing element of claim 1, wherein the first optical microring resonator includes a cascaded pair of optical microrings.

8. The processing element of claim 1, further comprising:
a second synapse lane configured to output a second electrical signal indicative of the value of a second synapse during the first cycle of the output neuron calculation;
a second optical AND unit including:
a second electrical input operatively coupled to the second synapse lane,
a second optical input configured to receive a second optical signal indicative of the value of a second input neuron transmitted during the first cycle of the output neuron calculation,
a second optical output, and
a second optical microring resonator configured to selectively couple the second optical signal from the second optical input to the second optical output based at least in part on the characteristic of the second electrical signal; and
an optical processing unit that includes:
a first optical interferometer having a third optical input operatively coupled to the first optical output of the first optical AND unit, and a third optical output, the first optical interferometer being configured so that an optical signal received at the third optical input at time $t=t_0$ is emitted by the third optical output at time $t=t_0+t_{bit}$, and a second optical interferometer including a fourth optical input operatively coupled to the third optical output of the first optical interferometer, a fifth optical input operatively coupled to the second optical output of the second optical AND unit, and a fourth optical output, the second optical interferometer being configured so that the optical signal emitted by the fourth optical output at time $t=t_0+2 \times t_{bit}$ is a sum of the optical signal received at the fourth optical input and the optical signal received at the fifth optical input at time $t=t_0+t_{bit}$,
wherein thia is an amount of time it takes to complete one cycle of the output neuron calculation.

9. The processing element of claim 8, wherein the second optical interferometer is a Mach-Zehnder interferometer.

10. The processing element of claim 1, wherein the first cycle is one of a plurality of cycles of the output neuron calculation.

11. The processing element of claim 1, wherein the characteristic of the first electrical signal is a voltage.

12. The processing element of claim 1, wherein:
the first optical AND unit further comprises:
a first optical waveguide operatively coupled to the first optical input; and
a second optical waveguide operatively coupled to the first optical output, and
the a first optical microring resonator operatively couples the first optical signal from the first optical input to the first optical output by coupling the first optical signal from the first optical waveguide to the second optical waveguide.

13. A method of operating a processing element for a neural network accelerator, comprising:
outputting a first electrical signal from a first synapse lane, the first electrical signal indicative of a value of a first synapse during a first cycle of an output neuron calculation;
receiving the first electrical signal at a first electrical input of a first optical AND unit;
receiving a first optical signal at a first optical input of the first optical AND unit, the first optical signal indicative of the value of a first input neuron transmitted during the first cycle of the output neuron calculation;
providing the first electrical signal to a first optical microring resonator; and
selectively coupling the first optical signal from the first optical input to a first optical output of the first optical AND unit with the first optical microring resonator based at least in part on a characteristic of the first electrical signal.

14. The method of claim 13, further comprising:
outputting a second electrical signal from the first synapse lane indicative of the value of a second synapse during the first cycle of the output neuron calculation;

receiving a second optical signal at the first optical input indicative of the value of a second input neuron transmitted during the first cycle of the output neuron calculation;

providing the second electrical signal to a second optical microring resonator; and selectively coupling the second optical signal from the first optical input to the first optical output with the second optical microring resonator based at least in part on the characteristic of the second electrical signal.

15. The method of claim 14, wherein:

the first optical signal has a first wavelength;

the second optical signal has a second wavelength different from the first wavelength;

the first optical microring resonator is configured to resonate at the first wavelength when the characteristic of the first electrical signal causes the first optical microring resonator to couple the first optical signal from the first optical input to the first optical output; and the second optical microring resonator is configured to resonate at the second wavelength when the characteristic of the second electrical signal causes the second optical microring resonator to couple the second optical signal from the first optical input to the first optical output.

16. The method of claim 13, further comprising:

receiving a third optical signal from the first optical output of the first optical AND unit at an optical input of an optical-to-electrical conversion unit;

converting the third optical signal to an electrical signal indicative of a product of the first input neuron and the first synapse;

receiving the electrical signal indicative of the product of the first input neuron and the first synapse at an electrical input of a shift and accumulate unit; and outputting a sum of the products received during each cycle of the output neuron calculation from the shift and accumulate unit.

17. The method of claim 16, further comprising:

applying a non-linear function to the sum of the products received from the shift and accumulate unit to generate an output neuron.

18. The method of claim 17, wherein the non-linear function is a hyperbolic tangent function.

19. The method of claim 13, wherein the first optical microring resonator includes a cascaded pair of optical microrings.

20. The method of claim 13, further comprising:

outputting a second electrical signal indicative of the value of a second synapse from a second synapse lane during the first cycle of the output neuron calculation;

receiving the second electrical signal at a second electrical input of a second optical AND unit;

receiving a second optical signal at a second optical input of the second optical AND unit, the second optical signal indicative of the value of a second input neuron transmitted during the first cycle of the output neuron calculation;

providing the second electrical signal to a second optical microring resonator;

selectively coupling the second optical signal from the second optical input to the second optical output based at least in part on the characteristic of the second electrical signal;

providing an optical signal from the first optical output of the first optical AND unit to a third optical input of a first optical interferometer, the first optical interferometer being configured so that the optical signal received at the third optical input at time $t=t_0$ is emitted by a third optical output of the first optical interferometer at time $t=t_0+t_{bit}$;

receiving the optical signal from the third optical output of the first optical interferometer at a fourth optical input of a second optical interferometer;

receiving the optical signal from the second optical output of the second optical AND unit at a fifth optical input of the second optical interferometer; and coupling the optical signals from the fourth optical input and the fifth optical input of the second optical interferometer to a fourth optical output of the second optical interferometer, wherein the second optical interferometer is configured so that the optical signal emitted by the fourth optical output at time $t=t_0+2\times t_{bit}$ is a sum of the optical signal received at the fourth optical input and the optical signal received at the fifth optical input at time $t=t_0+t_{bit}$, and $t_{bit}$ is an amount of time it takes to complete one cycle of the output neuron calculation.

* * * * *

UNITED STATES PATENT AND TRADEMARK OFFICE
CERTIFICATE OF CORRECTION

PATENT NO. : 12,039,433 B2
APPLICATION NO. : 17/178563
DATED : July 16, 2024
INVENTOR(S) : Karanth et al.

It is certified that error appears in the above-identified patent and that said Letters Patent is hereby corrected as shown below:

In the Specification

In Column 3, Line 66, change "The a first optical microring resonator may then operatively" to --The first optical microring resonator may then operatively--.

In Column 5, Line 57, change "FIG. 14 is a graphical view of area verses number of lanes" to --FIG. 14 is a graphical view of area versus number of lanes--.

In Column 6, Line 1, change "FIG. 19 is a graphical view of average latency verses the" to --FIG. 19 is a graphical view of average latency versus the--.

In Column 8, Lines 57-58, change "FIG. 3 depicts an exemplary optical adder in accordance embodiment of the invention comprising a Mach-Zehnder" to --FIG. 3 depicts an exemplary optical adder in accordance with an embodiment of the invention comprising a Mach-Zehnder--.

In Column 10, Lines 11-12, change "some state between the bar and cross states by an appropriate upper and lower phase settings." to --some state between the bar and cross states by appropriate upper and lower phase settings.--.

In Column 10, Lines 46-47, change "Another type of optical-to-electrical converter may be configured handle varying" to --Another type of optical-to-electrical converter may be configured to handle varying--.

In Column 12, Lines 56-57, change "For example, approximation techniques may used to overcome" to --For example, approximation techniques may be used to overcome--.

In Column 14, Lines 43-44, change "The optical AND units **118*a*-118*n* may selectively couple of optical signals having certain predetermined wavelengths" to --The optical AND units 118*a*-118*n*** may selectively couple optical signals having certain predetermined wavelengths--.

Signed and Sealed this
Tenth Day of December, 2024

Katherine Kelly Vidal
*Director of the United States Patent and Trademark Office*

CERTIFICATE OF CORRECTION (continued)
U.S. Pat. No. 12,039,433 B2

In Column 17, Line 61, change "of a respective interferometer 206a-206d at time to, and exit" to --of a respective interferometer 206a-206d at time $t_0$, and exit--.

In Column 17, Line 67, change "$I_{0,2} \times S_{0,0,2}$, and bit 1 of optical signal optical signal $I_{0,3} \times S_{0,0,3}$" to --$I_{0,2} \times S_{0,0,2}$, and bit 1 of optical signal $I_{0,3} \times S_{0,0,3}$--.

In Column 19, Lines 60-61, change "optical microring resonators can be approximated using the S-shaped curved shown," to --optical microring resonators can be approximated using the S-shaped curve shown,--.

In Column 23, Lines 11-12, change "the all-electrical embodiments consumes a majority of the relative energy," to --the all-electrical embodiments consume a majority of the relative energy,--.

In Column 23, Lines 61-62, change "FIG. 19 depicts a graph illustrating geometric mean latency verses bits per lane for an eight-lane accelerator." to --FIG. 19 depicts a graph illustrating geometric mean latency versus bits per lane for an eight-lane accelerator.--.

In the Claims

In Claim 8, Column 28, Line 25, change "wherein thia is an amount of time it takes to complete one cycle of the output neuron calculation." to --wherein $t_{bit}$ is an amount of time it takes to complete one cycle of the output neuron calculation.--.

In Claim 12, Column 28, Line 40, change "the a first optical microring resonator operatively couples" to --The first optical microring resonator operatively couples--.